INVENTORS.
George H. Campbell.
Raymond G. Martin.
Bradford Martin.
BY Wood, Herron & Evans.
ATTORNEYS.

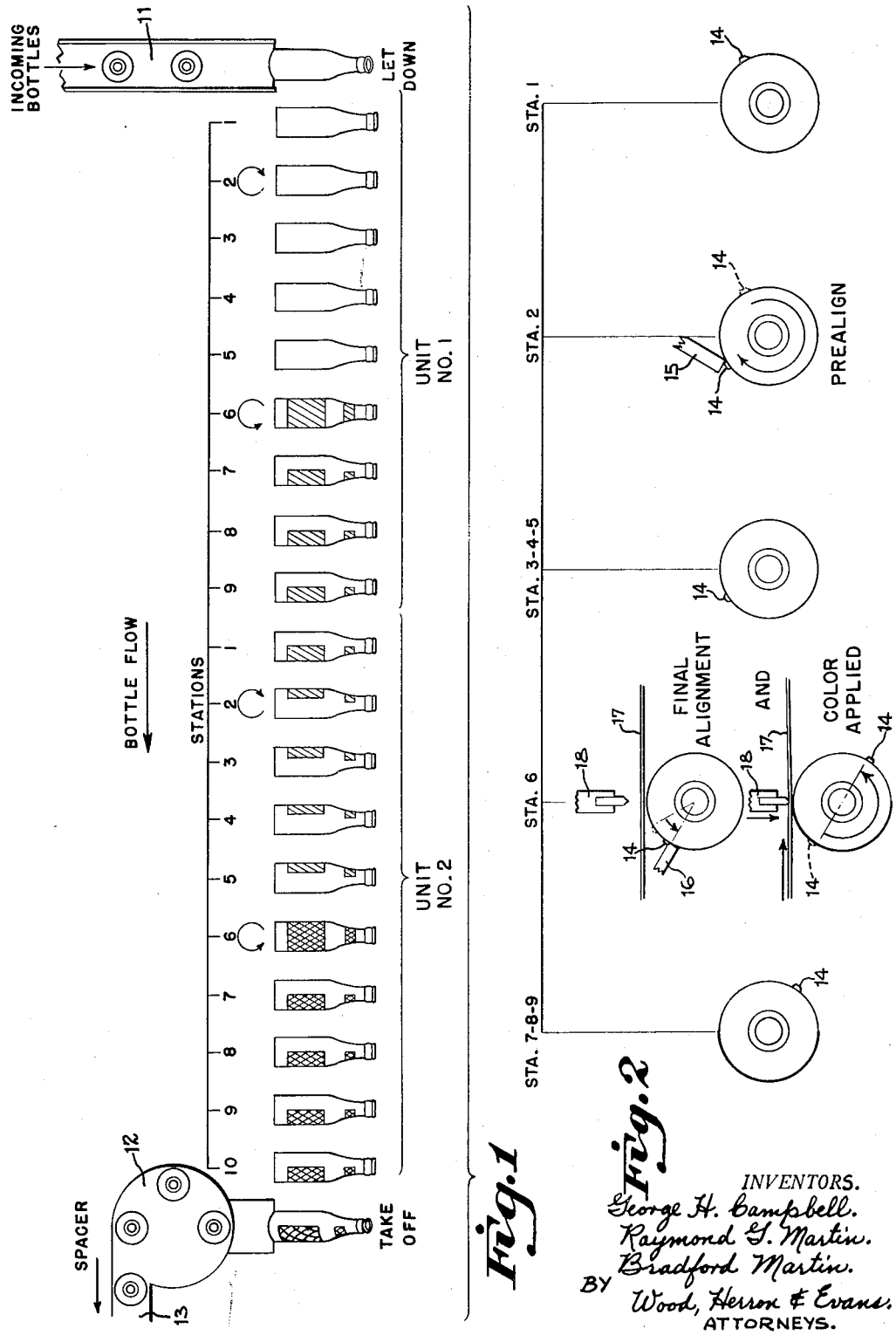

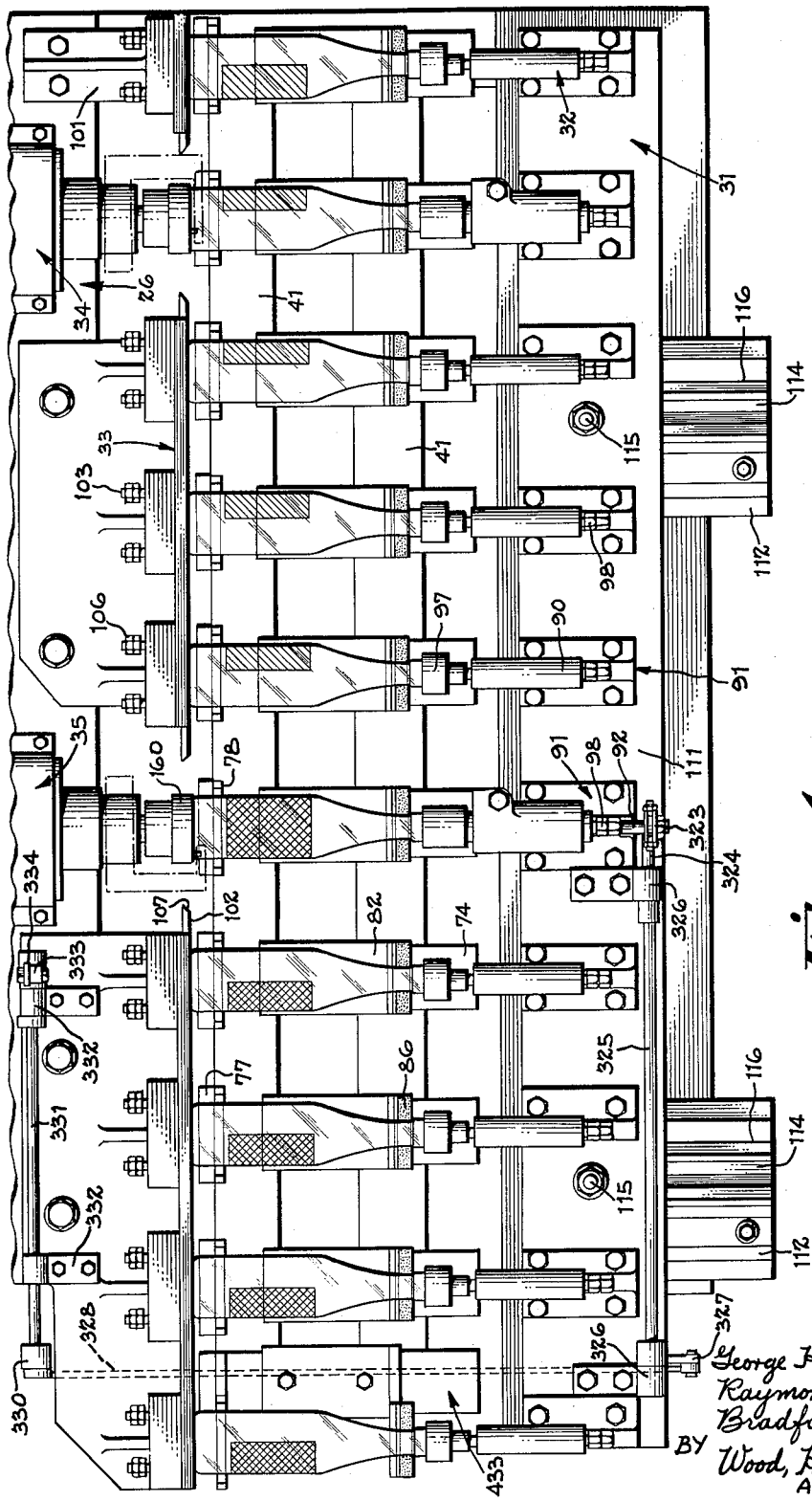

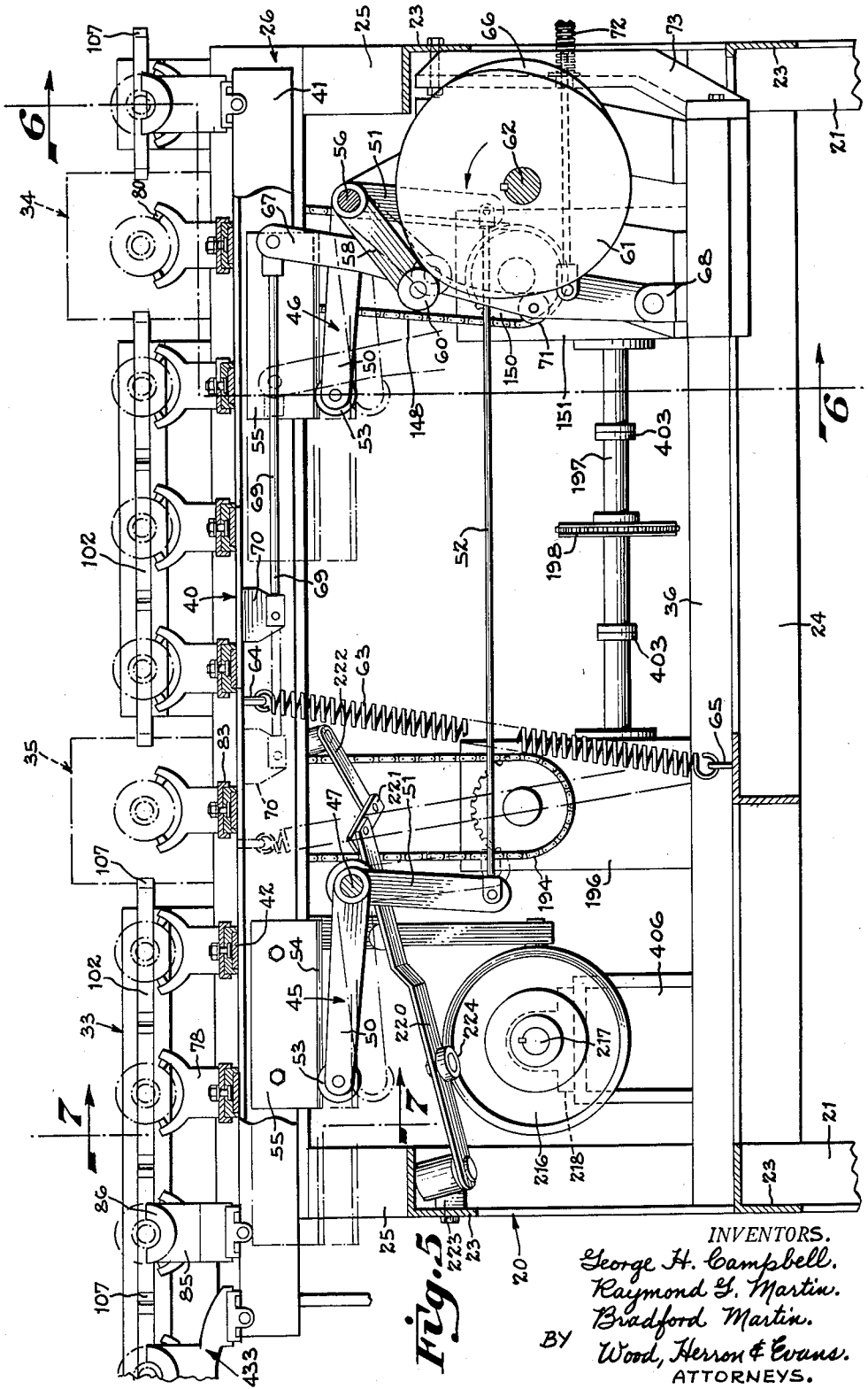

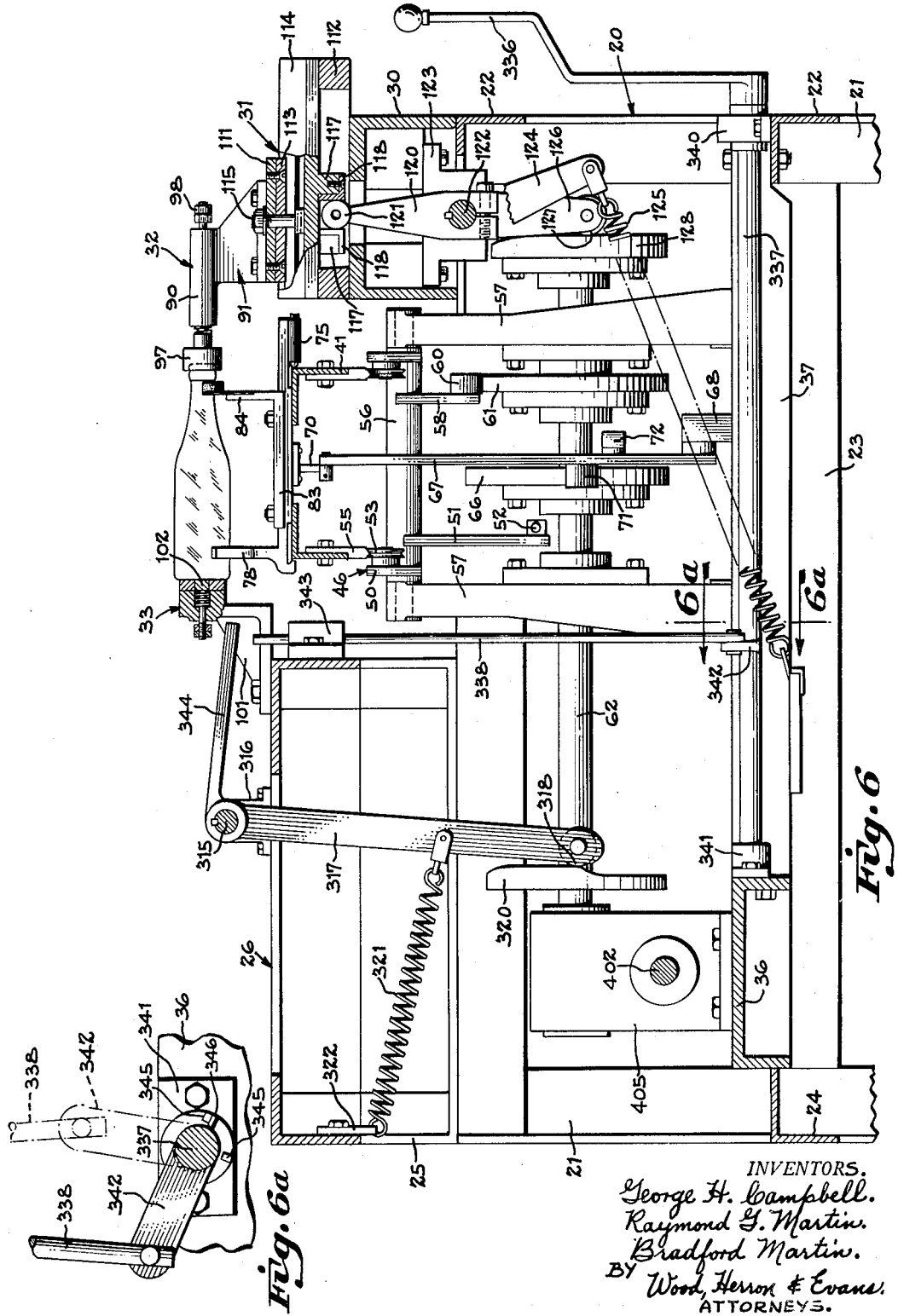

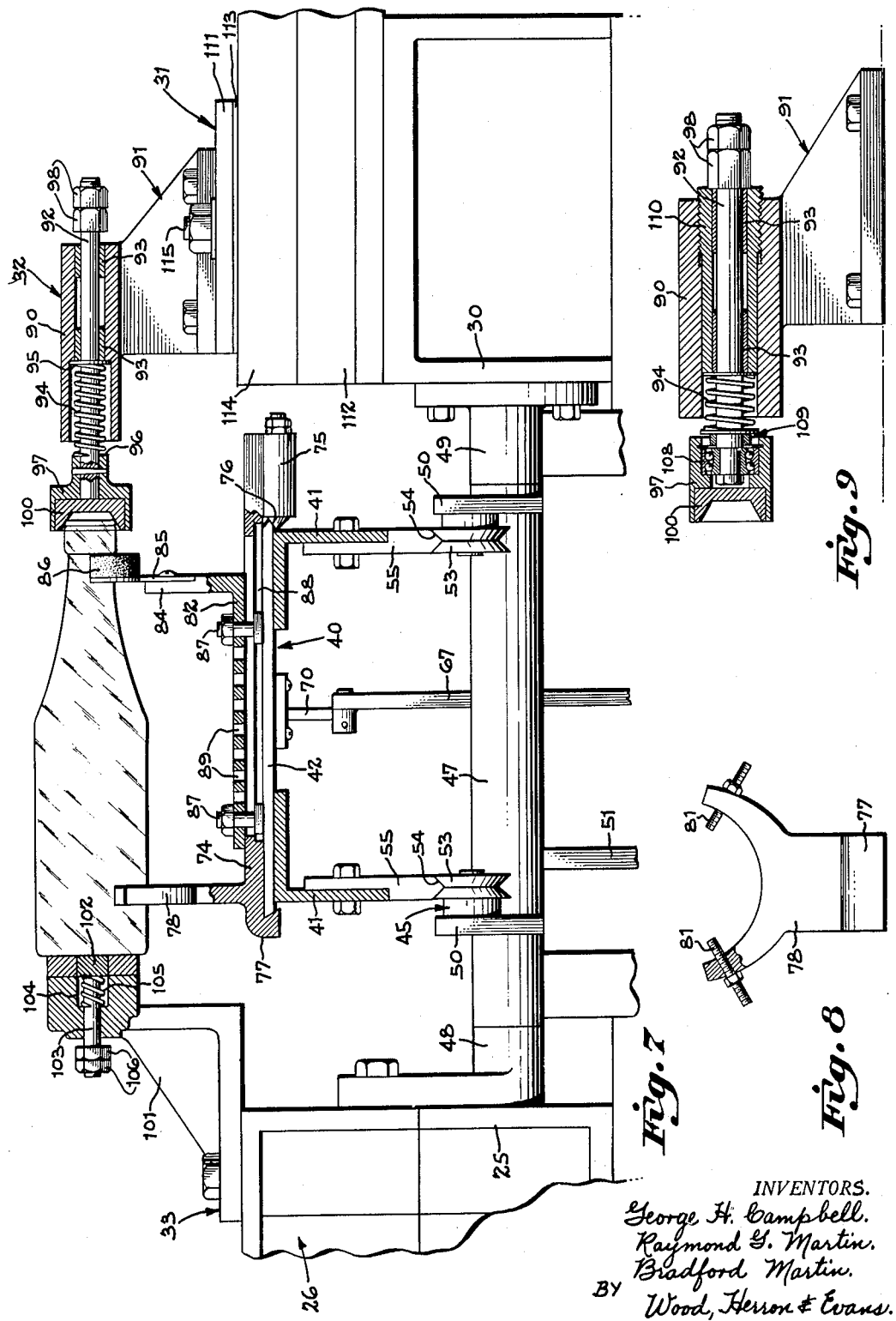

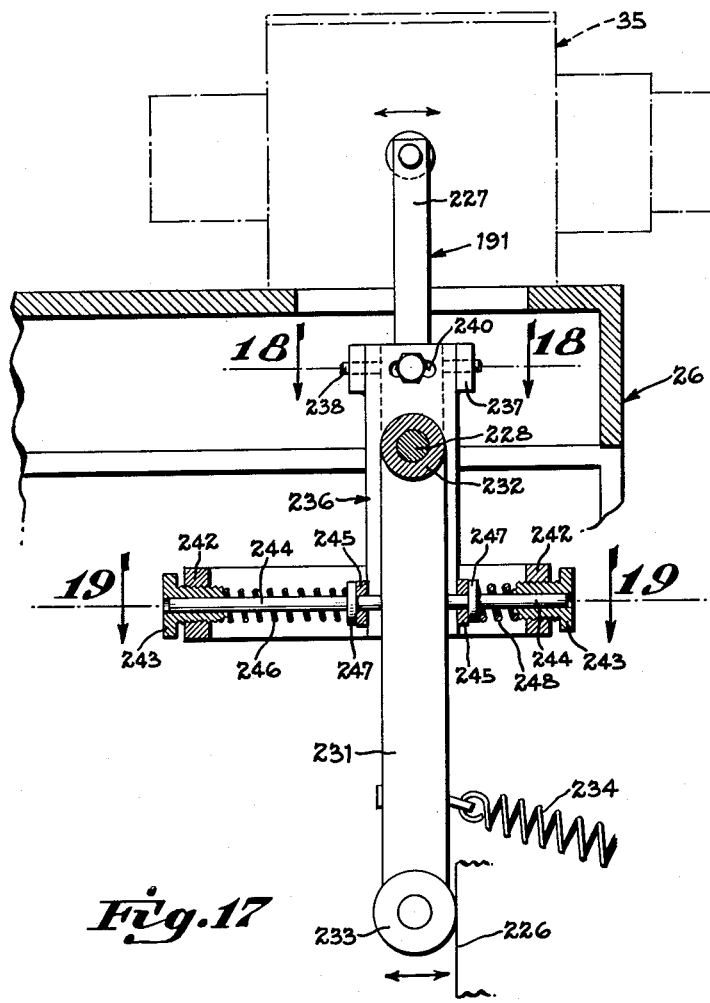
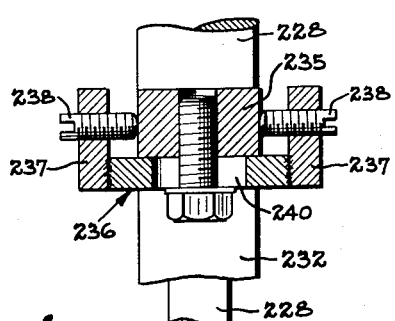
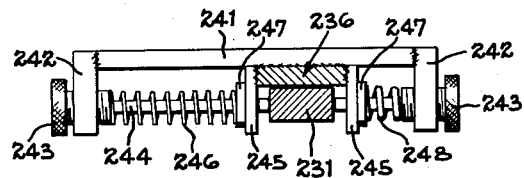

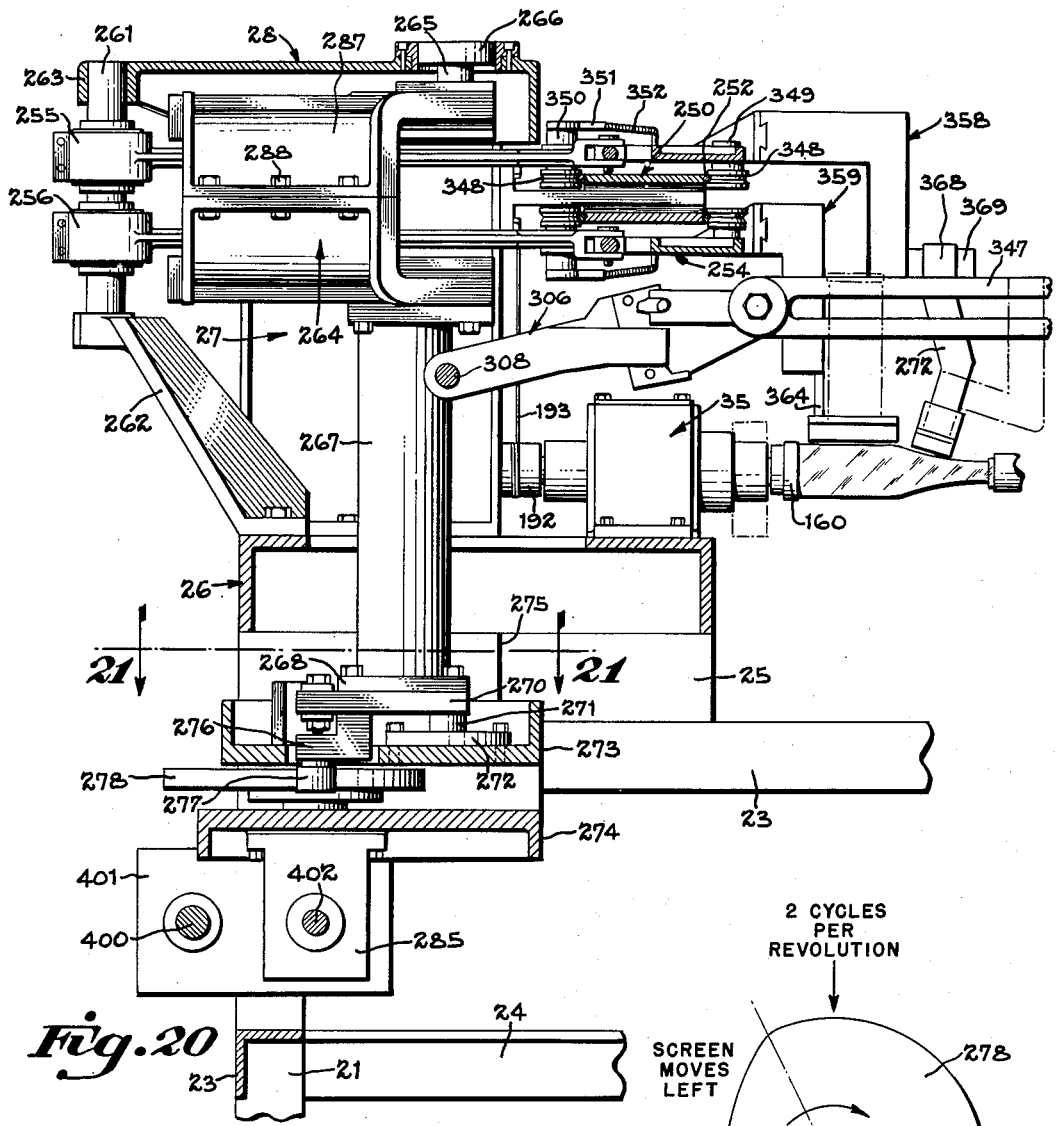

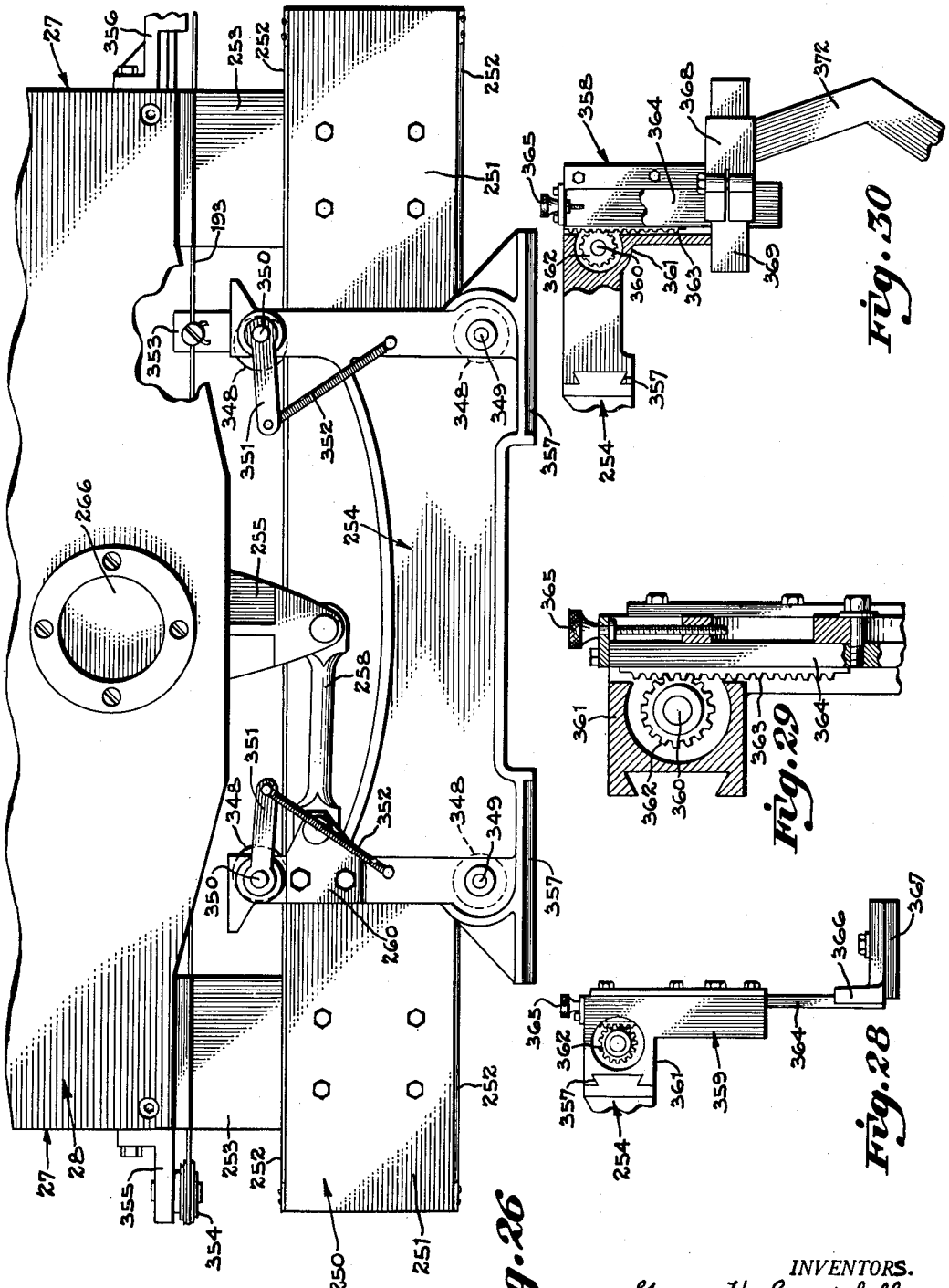

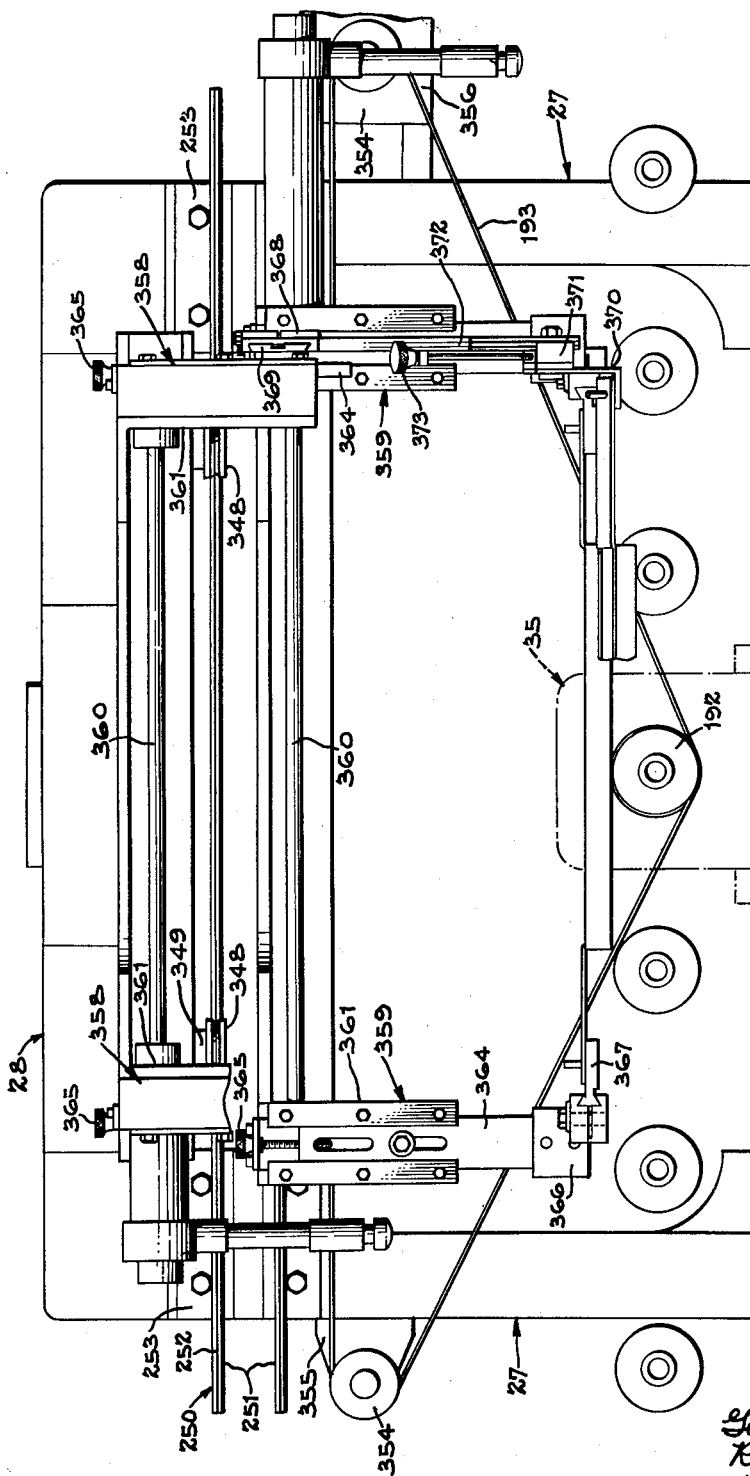

INVENTORS.
George H. Campbell.
Raymond G. Martin.
Bradford Martin.
BY Wood, Herron & Evans.
ATTORNEYS.

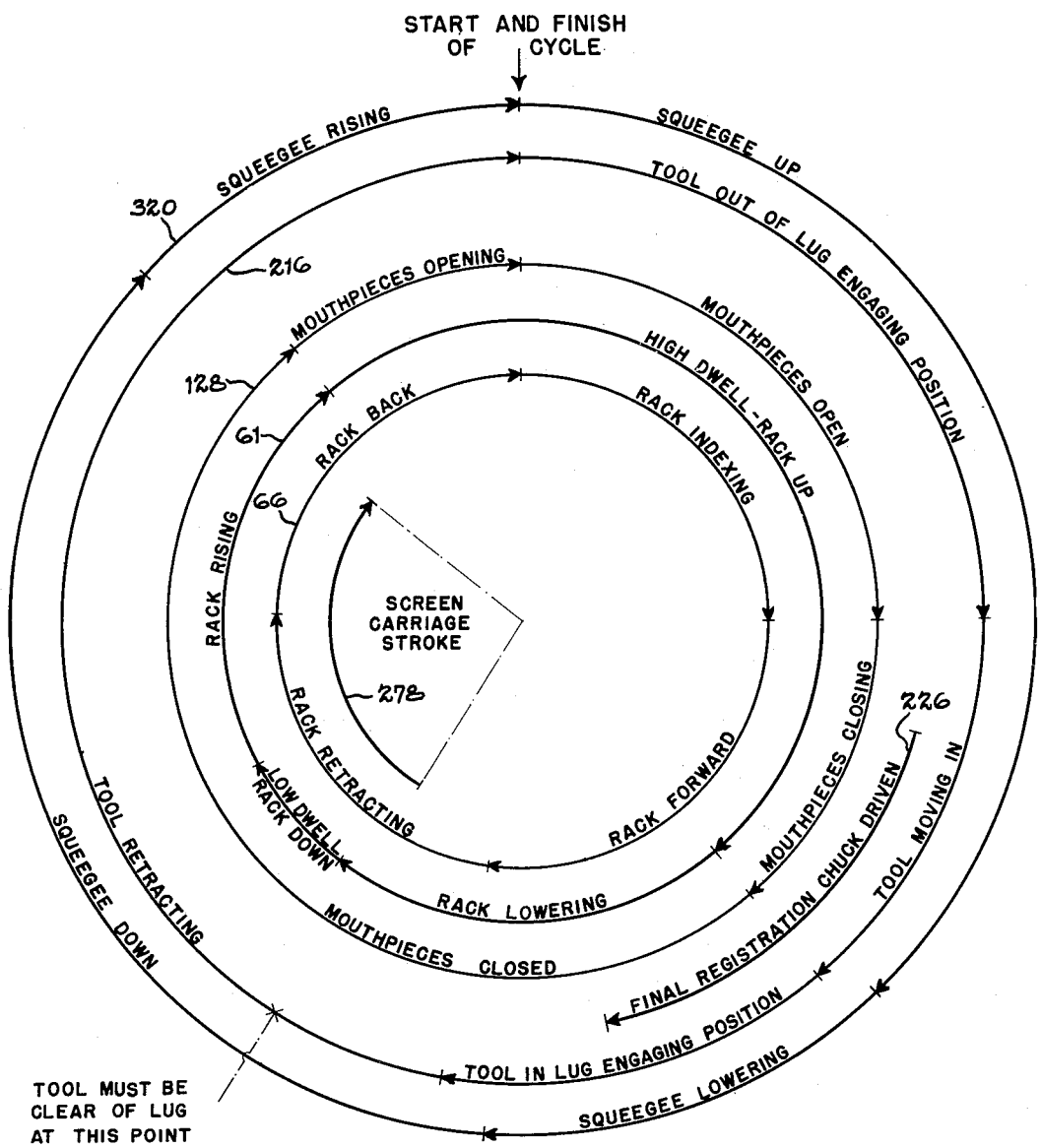

Oct. 25, 1955   G. H. CAMPBELL ET AL   2,721,516
WORK SUPPORTING AND REGISTERING APPARATUS
FOR BOTTLE DECORATING MACHINE
Filed Aug. 18, 1951   18 Sheets-Sheet 17
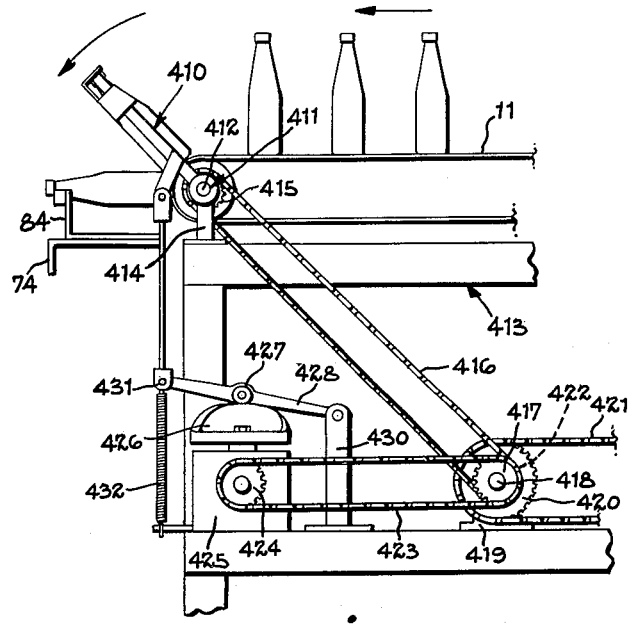
Fig. 38
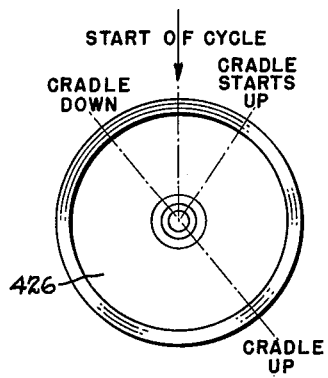
Fig. 39
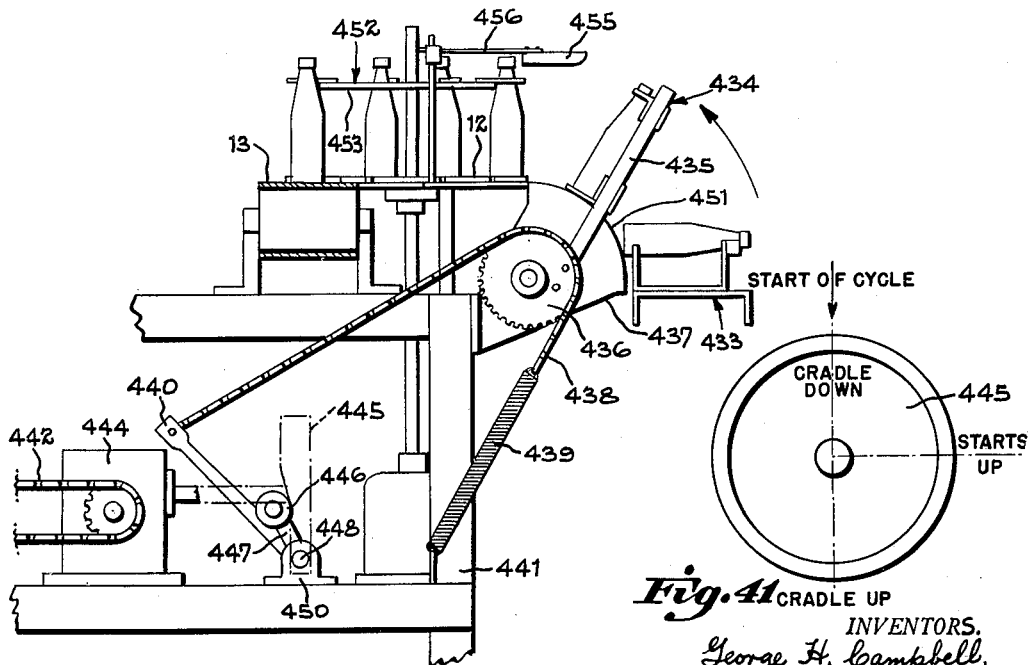
Fig. 40
Fig. 41
INVENTORS.
George H. Campbell.
Raymond G. Martin.
Bradford Martin.
BY Wood, Herron & Evans.
ATTORNEYS.

Oct. 25, 1955  G. H. CAMPBELL ET AL  2,721,516
WORK SUPPORTING AND REGISTERING APPARATUS
FOR BOTTLE DECORATING MACHINE
Filed Aug. 18, 1951  18 Sheets-Sheet 18

INVENTORS.
George H. Campbell.
Raymond G. Martin.
Bradford Martin.
BY Wood, Herron & Evans.
ATTORNEYS.

United States Patent Office 2,721,516
Patented Oct. 25, 1955

2,721,516

WORK SUPPORTING AND REGISTERING APPARATUS FOR BOTTLE DECORATING MACHINE

George H. Campbell, Beaver, and Raymond G. Martin and Bradford Martin, Washington, Pa., assignors to Solar Engineering & Equipment Company, Beaver, Pa., a corporation of Pennsylvania Application August 18, 1951, Serial No. 242,558

16 Claims. (Cl. 101—407)

This invention relates to decorating machines of the type designed to apply color compositions to articles by means of a screen process in which a screen membrane is utilized that is pervious in design areas and impervious in non-design areas. In operation, the screen membrane is engaged with a surface to be decorated and the color composition or decorating medium forced through the openings in the pervious areas by means of a squeegee, thus depositing upon the surface of the pattern or indicia of the design area. In multiple color stencil screen decorating, successive screens are utilized in the application of successive colors, the respective patterns or indicia being aligned or registered with respect to one another.

Color compositions utilized in stencil decorating are of two general types; the so-called "cold color" mixtures which dry at room temperature, and ceramic colors used for decorating vitreous or ceramic ware, which, after being applied, are fired at a relatively high temperature so that the deposited design or indicia becomes virtually a permanent, integral part of the ware. Both of these general types of compositions have, until recently, required drying periods between subsequent screenings in decorating operations where more than one color is applied. In the recent past, however, stencil decorating compositions have been developed in which the pigmented materials are carried in thermo-responsive vehicles which, when heated above room temperature, are of thin paste-like consistency, ideally suited for screen stencil work, but which freeze or solidify immediately upon being applied to the relatively cooler surfaces of articles which are at room temperature. By using these thermo-responsive coloring mediums, the drying steps between applications of different color layers may be eliminated without fear of smearing or producing work of an imperfect nature. Examples of thermo-responsive coloring mediums for both cold color and vitreous color work, and the method of using them, are disclosed in copending United States patent application, Serial No. 99,494, filed June 16, 1949, and now abandoned.

The present invention is directed principally to a stencil decorating machine which is designed to apply the vitreous type colors of these thermo-responsive compositions to glassware containers, particularly bottles; and it is the primary objective of the invention to provide a fully automatic machine in which a single color, or a number of colors in accurate registration may be applied to bottles during one pass through the machine so that when they emerge they are completely decorated and ready for firing. However, the machine of the invention may be utilized for cold color work, using thermo-responsive compositions for decorating other types of articles if desired.

It is a further objective of the invention to provide a fully automatic stencil decorating machine of the type described which is capable of operating efficiently at very high speed, maintaining a production rate as high as one article per second, but which also may be operated just as efficiently at lower speeds so that the discharge rate can be geared to existing lehr facilities in which decorated articles are fired.

It is another objective of the invention to provide a multiple color stencil decorating machine incorporating novel, positive acting registration mechanism which insures that the articles being decorated will always be oriented at successive decorating stations in the machine to insure precise registration of various successively applied colors.

A further object of the invention is to provide a novel drive mechanism for the stencil screens in the machine so that the body and neck portions of bottles can be decorated at the same time even though these two portions are of different diameters and require screens moving at different rates. In the preferred construction, two stencils, or screens, are provided at each of the decorating stations in the machine, the screens being capable of operating simultaneously but on areas of different diameters. Adjustable screen drive mechanism is provided so that each screen at a particular station can operate upon bottles varying in size and shape over a considerable range.

Other objects of the invention will be readily apparent from the detailed description of the drawings in which a typical embodiment of the invention is illustrated.

Figure 1 is a diagrammatic plan view of a decorating operation in which two machine units of the present invention are utilized.

Figure 2 is a diagrammatic view illustrating the bottle alignment operations in machine unit number one of Figure 1.

Figure 4 is a top plan view of the forepart of the machine shown in Figure 3 illustrating in particular the mechanism for conveying bottle.

Figure 5 is a cross sectional view through the forepart of the machine illustrating the rack mechanism and its drive.

Figure 6 is a cross sectional view through the left side of the machine unit taken on the line 6—6 of Figure 5.

Figure 6a is a fragmentary cross sectional view taken on the line 6a—6a in Figure 6.

Figure 7 is a fragmentary cross sectional view taken on the line 7—7 in Figure 5.

Figure 8 is a rear elevational view of a modified bottle carrier.

Figure 9 is a cross sectional view of the mouthpiece utilized at station 2.

Figure 17 is a fragmentary cross sectional view taken on the line 17—17 in Figure 15.

Figure 18 is a fragmentary cross sectional view taken on the line 18—18 of Figure 17.

Figure 19 is a fragmentary cross sectional view taken on the line 19—19 of Figure 18.

Figure 20 is a cross sectional view taken through the rear of the machine unit looking toward the left end of the unit showing the screen drive and squeegee mechanism.

Figure 21 is a fragmentary cross sectional view taken on the line 21—21 of Figure 20.

Figure 22 is a diagrammatic plan view of the cam which controls the movement of the stencil screens.

Figure 26 is a top plan view of the forepart of the supporting framework for the screen drive mechanism showing the tracks upon which the screen carriages are reciprocally mounted.

Figure 27 is a front elevational view showing mounting structure for two stencil screens.

Figure 28 is a side view of one of the supporting arms for the screens which decorates the body portion of bottles.

Figure 29 is a fragmentary sectional view of the upper part of Figure 28.

Figure 30 is a side view, partly in section of one of the supporting arms for the screen which decorates the neck portion of bottles.

Figure 37 is a timing chart for the machine.

Figure 38 is a side elevational view, looking toward the right end of the machine, showing the let-down mechanism which loads the machine.

Figure 39 is a diagrammatic elevational view of the let-down mechanism operating cam.

Figure 40 is a side elevation view, looking toward the left end of the machine, showing the take out mechanism which transfers the decorated bottles from the machine to a conveyor.

Figure 41 is a diagrammatic elevational view of the take out mechanism operating cam.

Figure 3:
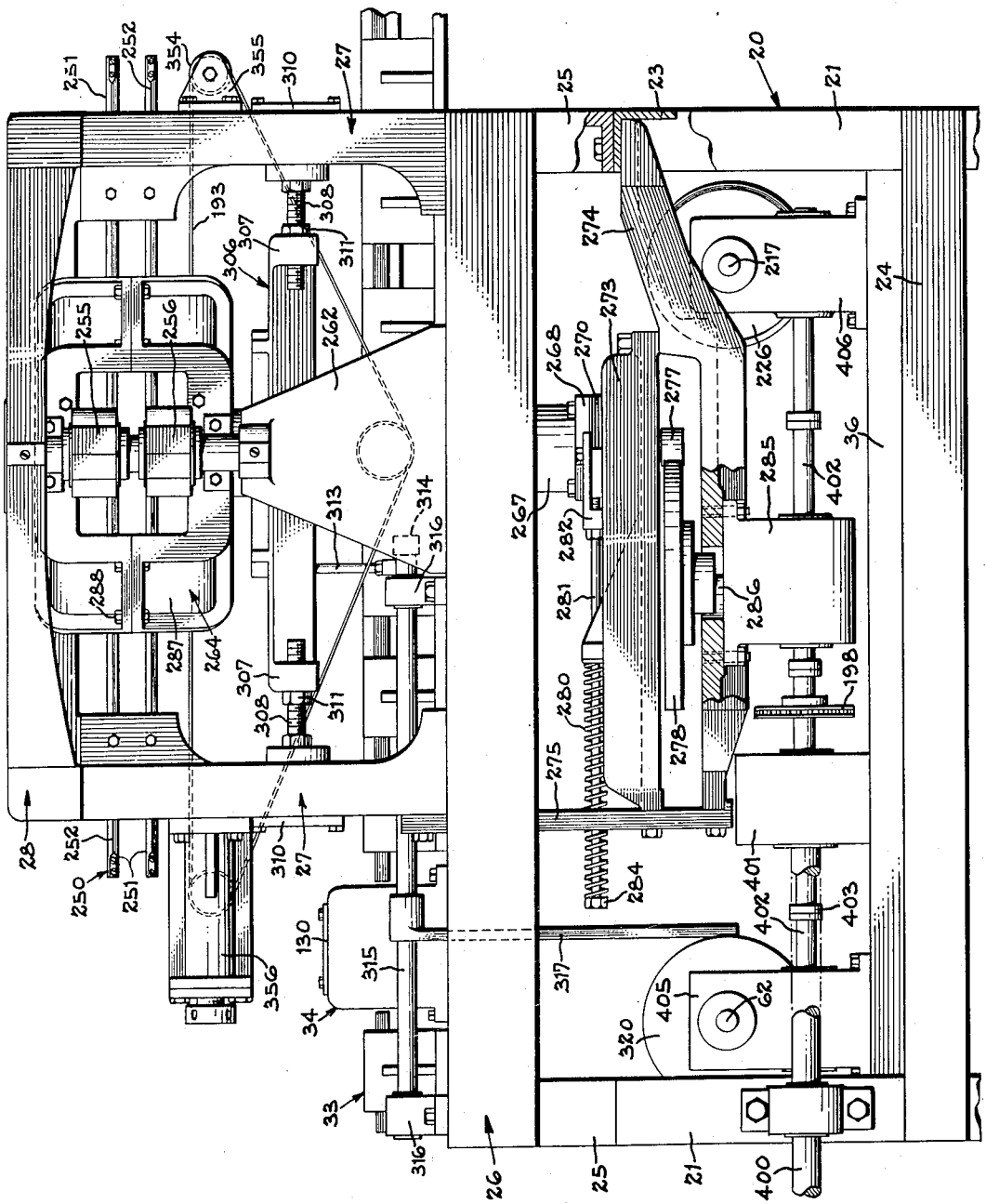
Figure 3 is a rear elevational view of machine unit number two.

In the following detailed disclosure, the invention is described in relation to the decoration of bottles of a particular size and shape with two colors; but it will be obvious that other containers or ware of generally cylindrical shape may be accommodated through minor changes in the few parts which actually contact the articles being decorated, and that additional colors may be applied by the use of additional stencilling stations.

The major parts of the machine and their functions are described in detail under separate headings; however, in order to facilitate full understanding of the machine, attention is first directed to Figures 1 and 2 of the drawings which illustrate the flow of ware through the machine.

Two decorating units which are substantially identical, are placed side by side so that the bottles move directly from one unit to the other, the first unit applying one decoration imprint, such as a background color, and the second a foreground color. If more than two colors are to be applied, the machine units are placed in series, the number of machine units in the series being dependent upon the number of colors to be applied to the particular ware.

Figure 1 illustrates diagrammatically a decorating operation in which only two units are utilized; the incoming bottles being conveyed to a let-down mechanism at the right of the machine as shown, and the outgoing bottles being removed from the left end of the machine as shown. There are nine stations indicated in machine unit number one, and ten stations indicated in machine unit number two. The tenth station in the second machine operates in conjunction with take off mechanism at its discharge end, station 1 of the second machine corresponding to the tenth station for the first machine. Other than this difference, the two machine units are identical.

The incoming undecorated bottles, after passing through a star wheel spacer which may be of conventional design and which for that reason is not shown, are moved on a conveyor 11 to the right end of machine unit number one. The bottles stand on conveyor 11 in vertical position. At the end of the conveyor a let-down mechanism is provided which lowers the bottles to the horizontal position with the necks extending toward the front of the machine. The bottles are then moved from station to station, from right to left through the first machine unit, and on into the second machine unit without interruption; the stations in the two units being equally spaced as indicated. At the left end of unit number two, the bottles are raised from the horizontal to the vertical position, passed through a star wheel spacer 12 and then onto a conveyor 13. In a typical production set-up a bottle loading platform, load conveyor and selector bar are off to the right of the diagram and the lehr off to the left or behind the machine.

The present machine is provided with a number of adjustments so that it is adapted to operate upon a wide variety of different sized and shaped bottles. The bottles are provided with small projections 14 cast or formed therein at a suitable location, for example, near the base. The projections or lugs facilitate precise locating of the ware for registration of successive decoration imprints.

When the incoming bottles move along the conveyor 11, through the let-down mechanism and to station 1 of machine unit number one, the projection 14 upon each bottle is at a random position. In the first machine unit, station 2 comprises a prealigning, or pre-registration station in which each bottle is rotated (e. g. clockwise) to bring the projection to a point which is at least near the position of final alignment. As the bottles are moved from station 2, through stations 3, 4 and 5 the relative position of the projection remains unchanged. At station 6, which is the first decorating station, the bottle is rotated in a counter-clockwise direction to bring the projection into final alignment position relative to the first screen so that when the bottle is stencilled at this station, the position of the impression made upon it is established relative to the lug. Thereafter, in successive screening operations, the lug is brought into the same relative position with respect to the screen by identical aligning mechanism, and thus all later impressions are screened upon the bottle in absolute registry with the first.

During the screening operation the bottle is rotated as the screen moves across it and the projection stops at some random point, the point being dependent upon the amount of surface decorated in the particular run. From station 6 the bottle is moved through stations 7, 8 and 9 without the position of the lug changing. At station 2 in the next machine unit, however, the lug is again pre-aligned, and at station 6 in this machine unit, finally aligned just as in the first unit, thus presenting the first impression to this screen in precise registry with it.

Figure 2 shows the above described operation in greater detail and illustrates diagrammatically what takes place in unit one only. The bottle in station 1 has its projection 14 at approximately the two o'clock position, looking at the bottle from the front of the machine, this position representing some random one. After being moved to the pre-aligning station 2, the bottle is rotated clockwise and stopped by a tool 15 at the eleven o'clock position. The projection remains here through stations 3, 4 and 5, and arrives at station 6 in this position. Two events take place at station 6. First, the bottle is turned counter-clockwise to move the projection 14 from the eleven o'clock position to the ten o'clock position, where it is stopped by tool 16. This movement takes place while screen 17 and squeegee 18 are up off the bottle. The final alignment movement of the projection from the eleven o'clock to the ten o'clock position is a rapid one with tool 16 being withdrawn after stopping the rotation of the bottle. With tool 16 out of the way, squeegee 18 is moved down and the screen translated to decorate the bottle. In the example shown, color is being applied to 180° of bottle surface so that during the screening operation the projection is moved from the ten o'clock position to the four o'clock position, to remain here through stations 7, 8, and 9 of machine unit 1 and station 1 of unit 2.

Breaking the registration of the bottles into two steps makes it possible to speed up the operation of the machine considerably. As indicated above, pre-aligning is accomplished by rotating the bottle clockwise and final alignment by rotating the bottle counter-clockwise. The screen however, alternates in its movement, moving left to right on one bottle and then right to left on the next one. Thus, there is no wasted motion at the screeen to slow the operation of the machine.

The pre-alignment mechanism at station 2 is always connected to a positive drive, a slipping clutch mechanism being provided so that the bottle can be stopped even though the drive continues. The drive at the final alignment station 6 is only intermittently connected with the main drive, however. When the bottle is being screened, it is connected with the screen drive so that it moves precisely with the screen. Thus, during the first fraction of a second while a bottle is at station 6, it is driven by the aligner in the counter-clockwise direction and then either counter-clockwise or clockwise depending upon which direction the screen is moving at the time.

Since the units of the machine are substantially identical, only one is shown in detail in the drawings, this one being unit two in the diagram of Figure 1.

Each machine unit is mounted upon a generally rectangular stand 20 (Figure 3, 5 and 6) which may be fabricated from angle iron pieces; including four legs 21, upper and lower front cross rails 22—22, upper and lower side rails 23—23, and a lower cross rail 24 which extends across the stand at the rear of the machine unit. In the rear portion of the machine unit (Figures 3 and 6), a pair of cast spacer blocks 25—25 are bolted onto upper side rails 23, these spacer blocks supporting a cast frame 26 which extends across the rear portion of the unit. The frame 26 has the squeegee and screening mechanism supporting structure mounted upon it at the left side of the machine unit (Figure 3). The supporting structure comprises, in general, a pair of end bells 27—27 and a top support plate 28. Another cast block 30 extends across the front of the machine unit being bolted to the upper rails of the stand (Figures 4 and 6). This block mounts translatable opener mechanism, indicated generally at 31 which carries a plurality of mouthpieces 32 adapted to receive the neck ends of the bottles being decorated (Figure 4). Along the front edge of the frame 26, back stop structure indicated generally at 33 is mounted, this structure providing a fixed or stationary abutment adapted to receive the base ends of the bottles. The bottle indexing and conveying mechanism is mounted between the front of frame 26 and the opener mechanism 31, extending across the machine from one side to the other (Figures 4–7). Both the pre-registration mechanism, indicated generally at 34, and the final registration mechanism, indicated generally at 35, are mounted on the forward edge of frame 26, breaks being provided in the back stop structure in order to accommodate them (Figure 4).

The stand also has bed plates mounted upon it. One, indicated at 36, extends across the rear of the machine unit, being bolted to the lower side rails, where it supports gear boxes and other drive mechanism to be described below. Another bed plate, indicated at 37, extends along the right side of the unit, being bolted at its forward end to the lower cross rail 22 and at its rear end to bed plate 36. Above bed plate 36, at the rear of the machine, the drive mechanism, and its support structure, for the screens is located (Figure 3).

*Bottle handling mechanism*

Reference is now made to Figures 4–7. These figures show the forepart of the machine only, with the registration mechanism indicated in dot dash lines.

The bottles are moved through each machine unit by means of a rack, indicated generally at 40 which is mounted for rectilinear movement, so that it picks up all of the bottles in the machine units as it rises, moves them ahead one station as it goes forward and then drops down and retracts to complete its cycle. The rack itself is constructed from a pair of angle irons 41, which extend longitudinally at the respective sides of the rack, and a plurality of cross pieces 42 which are secured to the two angle irons 41 at spaced intervals, corresponding to the spacing of the stations in the machine unit. In the instance shown, the cross pieces 42 are on six inch centers so that the machine can accommodate bottles of fairly large diameter, see Figure 5.

Generally, the rectilinear motion is accomplished by two linkages, one of these linkages operating to raise and lower the rack, and the other operating to index it longitudinally, the two being timed to provide the described motion. The linkage which causes the rack to raise and lower comprises a pair of bell-crank levers 45 and 46 which are respectively pivotally mounted near the left and right ends of the machine unit. Bellcrank lever 45 is journaled on a cross shaft 47 which is supported at its respective ends in journals 48 and 49, journal 48 being bolted to the front of frame 26 whereas journal 49 is bolted to the rear face of cast block 30 (see Figure 7). Each of bellcrank levers 45 and 46 includes a pair of spaced arms 50 which extend to the left from the pivot. Each bellcrank lever also includes a depending arm 51, the two being tied together by means of a rod 52. The outer ends of each of the arms 50 of both bellcrank levers 45 and 46 journal V rollers 53. Each of these rollers rides a track 54 which is mounted in the lower edge of a support bracket 55. The track support brackets are provided in pairs, on pair being located near the left end of the rack and the other pair near the right end, with the brackets of each pair being bolted at opposite points to the inner sides of the depending flanges of the angle irons 41.

Bellcrank lever 46 is pivotally mounted upon a cross shaft 56 which is journaled at its respective ends in spaced bearing support members 57, the support members being bolted to the bedplate 37 (see Figures 5 and 6). This bellcrank lever has a fourth arm 58 which extends downwardly toward the left from the bellcrank pivot and which has a cam roller 60 journaled at its outer end. Cam roller 60 rides the periphery of eccentric cam 61 which is keyed to a drive shaft 62 also journaled in the spaced bearing support members 57. It will be seen that as cam 61 turns in a counter-clockwise direction, as viewed from the front of the machine unit, both bellcrank levers 45 and 46 will be caused to rotate about their pivots and raise and lower the rack in timed cyclic sequence.

The rack is held down on rollers 53 of the two bellcrank levers 45 and 46 by means of a helically wound spring 63 which is fastened to the rack at its upper end by hook 64 and secured at its lower end to stand 20 by a hook 65. It will be noted from Figure 5, that the lower hook 65 is centered with respect to the two limits of travel of the rack, the retracted position of the rack being shown in solid lines and the forward position being shown in dot dash lines in this figure. Spring 63, in pulling downwardly on the rack, also functions to hold cam roller 60 against the periphery of cam 61.

A second cam 66 is also keyed to drive shaft 62 just behind cam 61. This cam functions to index the rack longitudinally of the machine unit. Motion is transmitted to the rack by means of an arm 67 which is pivotally journaled at its lower end in a block 68 bolted to bed plate 37. The upper end of arm 67 is pinned to the right end of a tie rod 69 which is affixed at its other end, by means of a bracket 70, to adjacent cross pieces 42 near the center of the rack. A cam roller 71 is journaled at one side of arm 67 near the lower end thereof, in position to ride the periphery of eccentric cam 66 and thereby cause arm 67 to swing back and forth as the cam rotates. Roller 71 is held against arm 67 by means of a rod and spring assembly 72 which are supported in bracket 73 bolted to the right side of the machine unit.

Each of the bottles is mounted upon the rack by means of a removable bottle carrier (see Figure 7). Each carrier is made in two pieces, one of which comprises a base piece 74 which is considerably longer than a cross piece 42 of the rack. The base piece has at its forward end a spring urged detent 75 which has a tapered inner end adapted to cam under the forward edge 76 of the cross piece 42, edge 76 extending just slightly beyond the side of the forward longitudinal angle iron 41 and being beveled for this purpose. At the rear end of the base piece 74 a depending lip 77 is provided which hooks over the rearwardly extended edge of cross piece 42. The base piece 74 of the carrier thus is held on to the cross piece 42 by lip 77 and detent 75 and may be removed therefrom by lifting its forward end to free detent 75 from edge 76.

Adjacent the rear end of the base piece 74 a Y-shaped bottle support element 78 rises. The upper ends of the arms of the Y element may have rubber bumpers 80 mounted thereon to provide support for the body portion of a bottle in the area adjacent its lower end; or preferably, as shown in Figure 8, threaded studs 81 may be utilized, the studs threading through the upper ends of the arms of the Y and providing adjustment for accommodating bottles of different sizes. An L-shaped neck piece support 82 is mounted on top of the base piece 74 having a pair of depending flanges 83 which embrace the respective sides of base piece 74. At the forward end of the neck piece support 82, a riser 84 is formed, the riser mounting a plate 85 which has affixed to it a rubber cradle 86. The plate 85, it will be observed, is merely bolted to riser 84 and can be removed and replaced with a different one having a cradle adapted to receive a bottle of a different size. The neck piece support 82 can be adjusted longitudinally of the base piece 74 to accommodate bottles of greater or lesser height than the ones shown. Adjustment is accomplished by means of T volts 87, the heads of which are disposed within a longitudinal groove 88 cut into the underside of the carrier base piece 74 and the shanks of which extend up through holes 89 drilled through neck piece support 82. Nuts are threaded onto the upper ends of the T bolts and turned down onto the neck piece support to clamp it to the base 74.

When two or more machine units are set up in series for multi-color operation, they are arranged so that the station spacing in going from one unit to the next is the same as it is within units. Preferably, the units are bolted or welded together so that the spacing does not change. The machine units necessarily have to operate in unison so that all bottles index simultaneously. For example, the rack shown in Figure 5 is at the start of its forward or indexing movement. At the completion of the movement, the bottle shown at the right end of the machine is at station two, the pre-alignment station, and if there were a machine unit to the right of the one shown its rack would overlap into this machine to deliver a bottle to station one. When two units are used, each rack preferably has one more bottle carrier on it than there are stations in the unit in which it is mounted, the extra carrier in the first machine serving as a receiver for incoming bottles and the extra carrier in the second machine delivering bottles to take-off mechanism.

It is found that the present system of moving the bottles through the machine units results in a more precise alignment at the stations than has been possible with the endless type chain conveyors utilized in the past. The spacing of the bottles is fixed. Endwise distortion in an endless conveyor results in a misalignment of all articles carried by it, whereas in the present rack, the only source of error is in a misalignment of an individual bottle carrier and this is easily corrected by shifting it one way or another. In addition, the movement of the rack is smooth since there is no looseness or slack to take up at the starting and stopping points in the rack cycle such as there is in a link or chain type conveyor.

The rack construction, the manner in which it is mounted and driven, and particularly the use of the helically wound spring 63 for holding the rack onto rollers 53 make it possible to operate it at very high speed. It will be observed in Figure 5 that spring 63 assists both acceleration and deceleration at the respective ends of the rack's travel. In starting the rack, the spring, being under tension, helps the driving parts overcome the inertia of the rack; and, at the other end of the rack travel places a gradually increasing load upon the rack which assists in overcoming rack momentum. Thus, the spring 63 works with the driving parts at starting and stopping points so that no excessive strains are placed upon them in high speed operation.

*The mouthpieces and backstop*

The mouthpieces which are mounted upon the translatable opener mechanism 31 define the stations in both of the units in the machine (Figures 4–9). In general, the mouthpieces move as a unit toward and from the back stop structure 33. The movement of the mouthpieces is coordinated with the rectilinear movement of the rack so that they move in at the end of the forward movement of the rack while it is still up to receive and hold the bottles during the lowering, retract and raising portions of the rack cycle, opening or moving away from the backstop when the rack is again in the raised position and ready to receive the bottles. The specific timing of the rack relative to the opener mechanism 31 is described at a later point.

The mouthpieces at the stations other than the two registration stations 2 and 6 in each of the units, are identical. Their construction is best shown in Figure 7. Each opener comprises a barrel 90 which is mounted upon a base, designated generally at 91. The barrel is bored axially to receive a stem 92 which is slidably mounted therein in bushings 93—93. The forward portion of the barrel is counterturned to provide an enlarged bore which accommodates a helical spring 94 that surrounds the fore part of the stem. The spring is seated upon a shoulder 95 at the inner end of the counterbore and presses against a shoulder 96 provided at the inner end of a mouthpiece receiver 97, the receiver being pinned onto the extended end of stem 92. The stem is limited in its inward movement by a pair of lock nuts 98 which are screwthreaded onto the end opposite the receiver. The face of each receiver is hollowed out and has a replaceable pad 100 seated in it. The exposed face of the pad is concave, tapering inwardly to provide a seat for the cap rim of the bottles, the taper serving to center them with respect to the axis of stem 92. Spring 94 acts as a cushion, for when the opener mechanism is translated inwardly it overtravels slightly the point of making contact between the receiver and bottles to an extent where the springs are compressed.

When the opener mechanism 31 is translated inwardly into bottle engaging position, the bases of the bottles are forced against the backstop structure 33. As pointed out above, the backstop structure is broken at the two registration stations so that at station 1, the backstop comprises only a short length which is centered upon the axis of the mouthpiece opposite it. The other portions of the backstop structure are broken into two lengths, one which extends through stations 3, 4 and 5 and the other of which extends through stations 7, 8 and 9 in unit one of the machine, and through stations 7, 8, 9 and 10 of unit two of the machine (see Figure 5). Since all of the parts of the backstop structure are substantially alike, in describing it reference will be made only to that part at station 1, see Figures 4 and 7. This portion of the backstop structure includes a bracket 101 which is bolted onto the top of frame member 26 with the forward face of the backstop overhanging the forward edge of the frame. The center of the face of the backstop is grooved longitudinally to seat a spring-cushioned backstop bar 102. The bar has a pair of studs 103 welded to it, these studs extending through holes drilled through the backstop within the groove. Just inwardly of the groove, the holes are enlarged as at 104 to accommodate springs 105. These springs surround studs 103 and serve to urge bar 102 outwardly. The outward movement of bar 102 is limited by means of pairs of lock nuts 106 which are threaded onto the inner end of each of the studs and abut the rear of the backstop when the bar is extended slightly beyond the face of the backstop. The spring urged bar in the backstop pushes the bottles away from the face of the backstop when they are released by the mouthpieces and received by the rack. The slight clearance afforded insures that the bottles do not catch upon backstop structure during subsequent indexing. In addition, both ends of the bar are bevelled at 107 so that the bottles do not catch upon them during indexing.

At stations 1, 3, 4, 5, 7, 8, and 9 the bottles are simply clamped between the backstop and the mouthpieces at the end of each indexing cycle. At the two registration stations, however, the bottoms of the bottles are held by chucks to be described later. However, since the chucks rotate the bottles at these two stations, the mouthpieces opposite them are of slightly different construction than the ones described above, see Figures 2 and 9. These mouthpieces each comprise a barrel 90, a base 91, with a stem 92 and spring 94 mounted within the barrel just as in the case of the other mouthpieces. However, at the forward end of stem 92, the bottle receiver is mounted upon a ball bearing 108 so that it can rotate freely with respect to the stem. Also, a collar and washer set, indicated generally at 109, is provided adjacent the ball bearings to seat the spring 94. Additionally, the stem 92 can be adjusted longitudinally within barrel 90 by means of a thimble 110 which is threaded inside the outer end of barrel 90, the outer end of the thimble in this instance acting as the stop to limit the inward movement of stem 92.

All of the mouthpieces are bolted to a base plate 111 translatably mounted upon a pair of spaced cross slide members 112—112 which are bolted to the top of cast block 30 at the front of the machine. Underneath base plate 111, at each of the cross slide members 112, a guide plate 113 is bolted. Each guide plate is seated within a channel cut into the top of a slide block 114 and is affixed to the block by a T bolt 115 (see Figure 6). This construction permits the base plate to be adjusted inwardly and outwardly with respect to the slide blocks 114. Each slide block is, in turn, mounted in a dovetail groove 116 which is cut into each of the cross slide elements 112. The inside of each of the cross slide elements, beneath the slide block, is hollow and a pair of lugs 117 depend from slide block 114 into the space provided. Each lug has an L-shaped wear plate 118 bolted to it, the vertical arms of the two wear plates facing one another. Translatory motion is imparted to the opener mechanism through a crank arm 120 which has a rider 121 fastened at its upper end engaged between the wear plates 118 on the two lugs 117. The lower end of crank arm 120 is keyed to a crank shaft 122 extending across the front of the machine under cast block 30. Shaft 122 is journalled in spaced pillow blocks 123 which are bolted to the under side of the cast block adjacent the ends of the shaft. Near each of the pillow blocks a lever arm 124 is keyed to shaft 122, these arms depending from the shaft and connected by heavy helical springs 125 to the stand 20 of the machine. Looking from the left end of the machine, springs 125 (only one of which is shown here) tend to turn shaft 122 in the clockwise direction, thus moving the opener mechanism away from bottle engaging position. The inward movement of the opener mechanism is accomplished through a cam lever 126 which carries a cam roller 127 at its lower end. The cam roller rides upon the track of a face cam 128 being held against the track by springs 125. Cam 128 is keyed to drive shaft 62 which also drives both the index cam and the lifter cam for the rack 40. Thus, with this arrangement, it is quite simple to coordinate the rack and opener movements by adjusting the relative positions of the cams around the shaft.

The opener mechanism of the machine unit shown provides a wide latitude of adjustment and can accommodate a variety of different bottle sizes. The inward limit of travel of the mouthpieces can be adjusted readily by resetting guide plates 113 relative to the base plate 111 to change from a bottle of one height to another. In addition, the removable pads 100 make it relatively simple to adapt the mouthpieces to bottles having different cap rims. Also, the mouthpieces themselves can be removed from the stems 92 and replaced with ones of a different size if a great change in the type bottle is to be made, that is, if wide mouth bottles such as milk bottles are to be decorated. Of course, the backstop structure 33 of the invention, has the advantage that it can accommodate any bottle as long as it has a relatively flat bottom.

Slightly uneven bottle bases or bottoms are taken care of by the spring urged backstop bars 102. It will be noted from Figure 5 that the backstop bars at stations 3, 4, 5 and 7, 8, 9, 10 comprise individual sections, just as at station 1 which was described above. Thus, when bottles are held between the backstop structure and the opposite mouthpieces, the bars can shift individually where necessary in order to compensate for base irregularities. Upon their release by the mouthpieces, the bottles are pushed away from the backstop structure 33 by the bars 102 so that as they move into the stations having chucks, they will clear the peripheral lips of the chucks. Thus, the backstop bars perform two functions, one, to compensate for unevenness in the bottoms of the bottles and, two, to push the bottles forwardly slightly away from the backstop structure.

*Pre-registration station*

Figure 10:
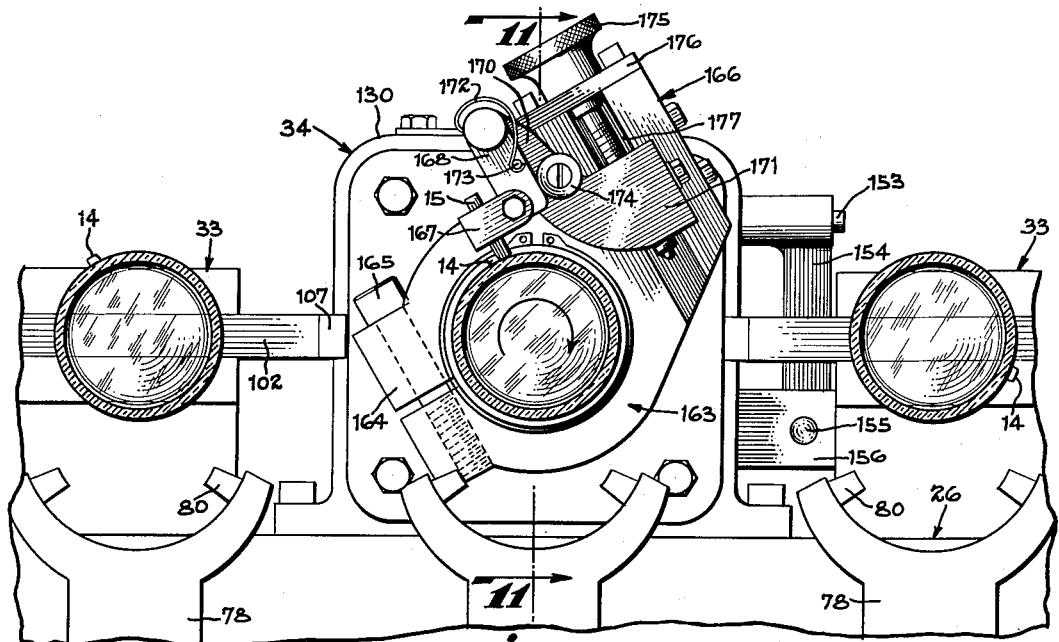
Figure 10 is a front elevational view of the pre-registration mechanism.
Figure 11:
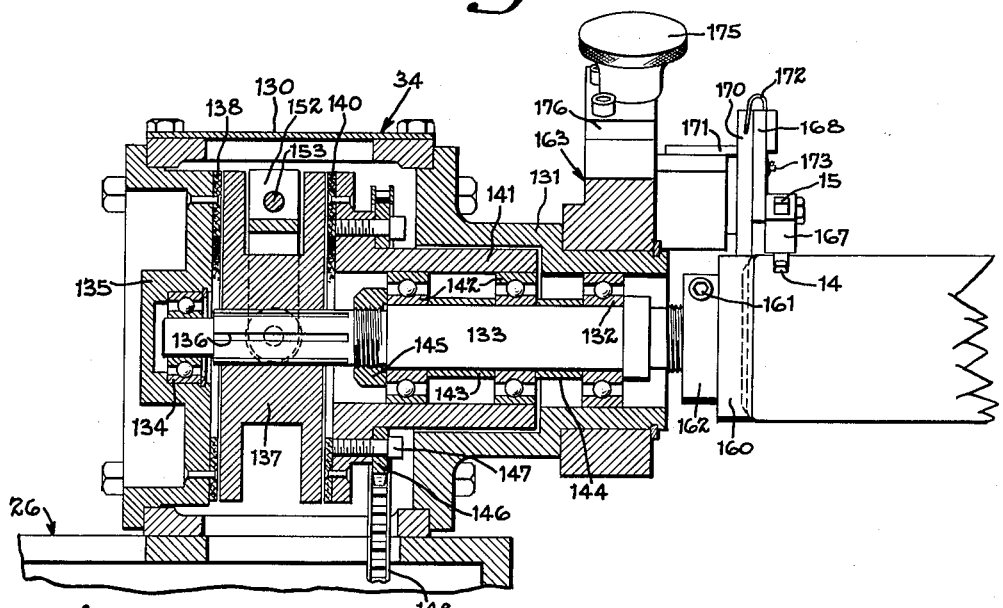
Figure 11 is a cross cross sectional view taken on the line 11—11 of Figure 10.
Figure 12:
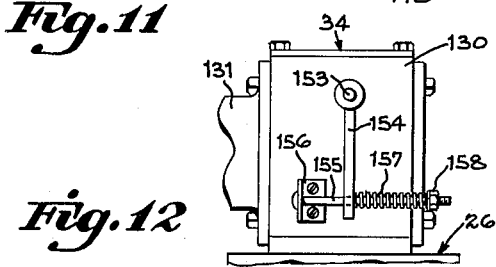
Figure 12 is an elevational view of the right side of the pre-registration mechanism case.

The pre-registration mechanism 34 which is shown in detail in Figures 10–12, is mounted within a case 130 that is bolted to the top of frame 26 near its forward edge. The front of the case includes a hub 131 which extends toward the front of the machine unit overhanging the forward edge of frame 26. On the inside of the hub near the outer end, a ball bearing 132 is seated which journals the forward end of a drive shaft 133. The rear end of the shaft is journaled in a ball bearing 134 which is seated within an end closure plate 135 bolted to the rear of case 130. Inwardly of the ball bearing 134, shaft 133 is splined as at 136, and slidably mounted on this section of the shaft is a shiftable clutch element 137. A ring 138 of clutch lining material is riveted on the inner face of the end closure plate 135 and on the opposite side of the shiftable clutch 137 a similar ring 140 is riveted to the face of a drum 141. The drum is rotatably journaled upon shaft 133 by a set of spaced ball bearings 142—142 so that it can revolve freely with respect to it. A bushing 143 is mounted on shaft 133 between bearings 142—142, and a second bushing 144 mounted between the forward one of bearings 142 and bearing 132. A nut 145 threaded on shaft 133 just forward of the splined section is tightened against the inner race of the rear one of bearings 142 to pull a collar 144, formed on shaft 133, against the inner race of bearing, thus, holding drum 141 against longitudinal displacement relative to shaft 133. The drum mounts a sprocket ring 146 which is bolted to it as at 147. The sprocket ring 146 is driven by means of a chain 148 which is looped over the top of it and extends down through an opening in the case and an opening in the frame 26 to the lower part of the machine where is passes around a sprocket 150. The lower sprocket is driven through a gear box 151, the drive being a constant one.

It will be seen that when the shiftable clutch member 137 is moved to the right, as shown in Figure 11, that a driving connection is made between drum 141 and shaft 133, and when it is moved in the opposite direction, shaft 133 is braked to a stop by engagement of the clutch member 137 with ring 138. Normally, clutch member 137 is in driving connection with drum 141 being held there by means of a yoke 152 which is pivotally mounted upon a shaft 153 journaled in opposite side walls of case 130. On the outside of the case, an arm 154 is keyed to shaft 153 and depends from it, as shown in Figure 12. The lower end of arm 154 is pierced and the shank of a bolt 155 extends through it. The head end of bolt 155 is welded to an angle bracket 156 which is secured to the side wall of case 130. A spring 157 surrounds the shank of the bolt and is under compression between depending arm 154 and a nut 158 which is threaded onto the end of the bolt. The spring urges arm 154 in the clockwise direction as viewed in Figure 6, and thus, in turn, urges clutch member 137 into driving connection with drum 141.

The outer end of drive shaft 133 is threaded and carries a chuck 160 which is clamped onto it by a bolt 161 which serves to close a collar portion 162 of the chuck. The outer face of the chuck is concave and adapted to receive the lower ends of bottles, the bottles being pressed against the chuck by means of the mouthpiece which is opposite it. As long as there is no resistance to the rotation of shaft 133, the driving connection between drum 141 and clutch member 137 remains constant. However, when resistance is encountered, slipping occurs between clutch member 137 and the ring of clutch lining material 140 on drum 141, the point at which slipping starts to occur being governed by the amount of tension on spring 157, this in turn, being governed by the amount that the nut 158 is tightened onto the shank of bolt 155.

The prealigning tool 15 is mounted in an adjustable frame 163, this frame including a split collar 164 which is clamped onto the outer end of a hub 131 by means of a bolt 165. This arrangement permits the whole tool to be rotated about the axis of shaft 133 to position the point at which the tool engages projection 14 on the bottle. In the instance shown in Figure 10, the tool holder frame 166 is turned so that projection 14 is stopped in the 11 o'clock position as explained above. The tool itself is carried in a clamp 167 mounted at the lower end of an arm 168. The upper end of arm 168 is pivotally mounted on a finger 170 which projects from an adjustable slide block assembly 171. Arm 168 is urged toward the right as shown in this figure by means of a hair spring 172 which is seated at one end in finger 170 and hooked around a pin 173 on arm 168 at its other end. A stop 174 is provided on finger 170 to hold the tool in projection contacting position. This construction allows the tool to swing out of the way in case a bottle is received at the station with the lug 14 standing up where it might engage the tool prior to its prealigning movement and also permits the tool to swing clear of the bottle when it is indexed. The slide block assembly 171 is adjustable to move the tool toward or away from the axis of the bottle by means of a thumb screw 175 being rotatably mounted in an end plate 176 bolted at the upper end of a slide groove 177 cut into the tool holder frame 166. The tool may also be adjusted longitudinally of the slide block assembly 171 being made in two parts and adjustably bolted together for this purpose.

When a bottle is received at the prealigning station, projection 14 is at some random position on the periphery of the bottle. As soon as the mouthpiece opposite this station moves in on the cap end of the bottle, its base is forced against chuck 160 in driving contact. The bottle then rotates until projection 14 contacts tool 15 whereupon the bottle stops. Thereafter slipping occurs between drum 141 and clutch member 137.

*Final registration station*

Figure 13:
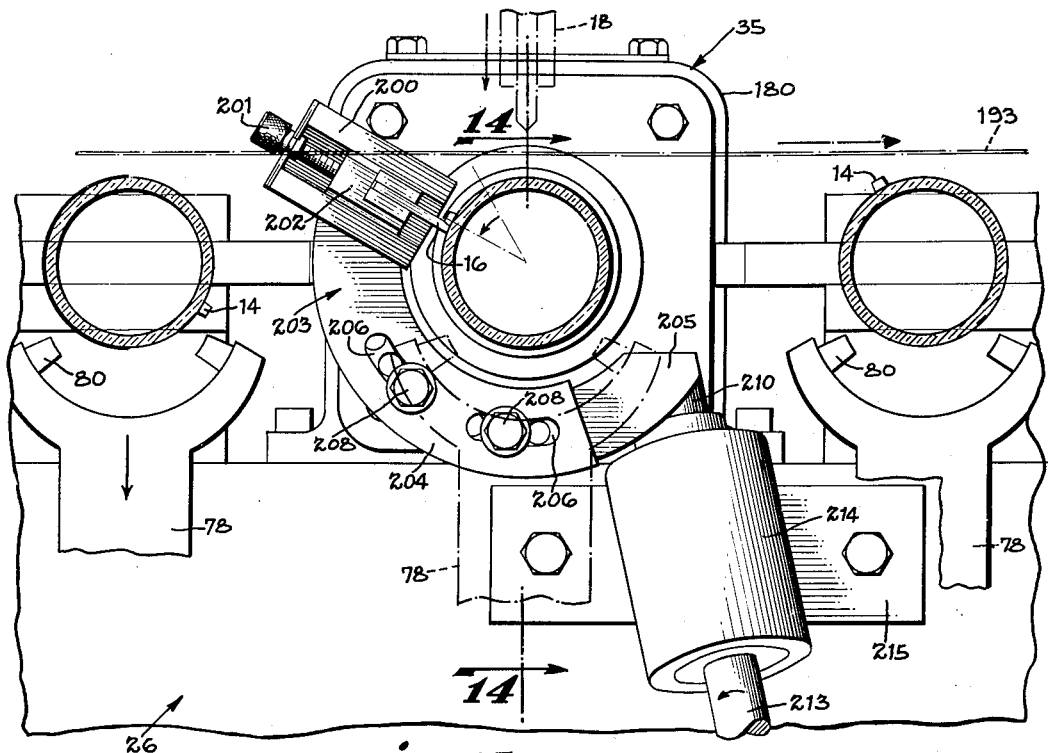
Figure 13 is a front elevational view of the final registration mechanism.
Figure 14:
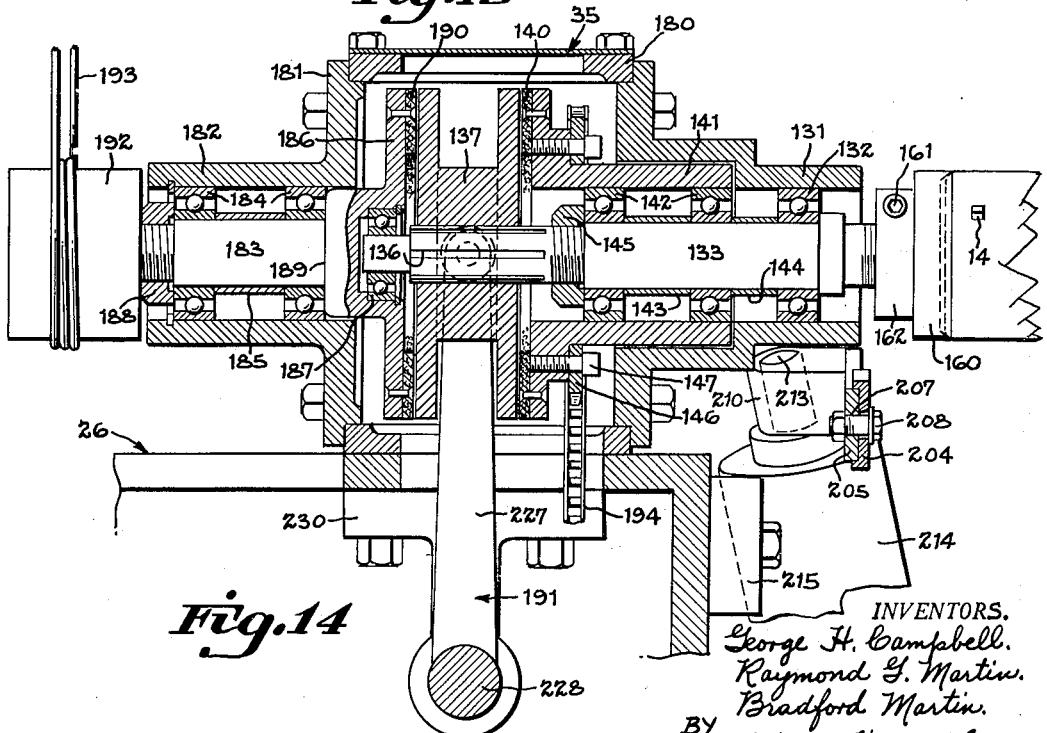
Figure 14 is a cross sectional view taken on the line 14—14 of Figure 13.

The final registration mechanism is housed within a case 180 (Figures 13 and 14). The forepart of this case is the same as case 130 described above, with the same reference numerals being used to identify the previously described parts. The only significant difference is that the rear of case 180 has a different type of end plate mounted upon it. This end plate, which is indicated at 181, includes a hub 182 which projects rearwardly, in line with shaft 133. Inside the hub, a second shaft 183 is journaled by a pair of ball bearings 184 which are separated by a bushing 185. Shaft 183 carries a clutch plate 186 at its forward end, and in the center of the face of the plate, a ball bearing 187 is seated. This bearing corresponds to bearing 134 of the pre-registration station mechanism and journals the rear end of shaft 133. Shaft 183 is locked against longitudinal movement in the hub 182 by means of a nut 188 which is threaded onto the shaft against the inner race of the rear ball bearing of pair 184, pulling a shoulder 189, which is formed between clutch plate 186 and shaft 183, against the inner race of the forward ball bearing of the pair.

The inner face of the clutch plate 186 has a ring of clutch plate material 190, riveted to it which is adapted to be engaged by clutch member 137 when the member is shifted rearwardly on the splined section 136 of shaft 133. In this instance a cam controlled clutch yoke 191 is provided for shifting clutch member 137. When the clutch member is moved forward, shaft 133 is brought into driving connection with the driven drum 141 as is done at the pre-registration station. However, when the clutch yoke is shifted to the rear at this station, shaft 133 is brought into driving connection with shaft 183.

Outside of hub 182 a cylinder 192 is threaded onto the end of shaft 183. The cylinder is machined carefully so that it is exactly the diameter of the body portions of the bottles being decorated. Several turns of a wire cable 193 are wound around cylinder 192 and pinned to it with the two ends of the cable run over spaced pulleys and affixed to the carriage of the screen which decorates the body portion of the bottle (to be described in detail later). As the screen moves across the bottle, shaft 133, which carries the bottle chuck 160, therefore, is turned precisely with the movement of the screen.

The shifting of clutch yoke 191 is timed with the movement of tool 16 at this station so that when the tool is in lug engaging position, the drive to the chuck is through drum 141 from a chain 194. In this instance, the chain is engaged around a sprocket 195 driven from a gear box 196, see Figure 15. This gear box corresponds to gear box 151 of the pre-registration station and is interconnected with it by a shaft 197. Shaft 197 is in constant driving connection with the main drive shaft by a sprocket and chain 198, as will be explained below. The only difference in the gear boxes is that the one which is associated with the pre-registration mechanism is arranged to drive clockwise and the one at the registration mechanism arranged to drive counter-clockwise.

The tool 16 at the final aligning station is clamped in the outer end of a slide block 200. The tool is adjustable inwardly and outwardly, radially of the chuck axis by means of a thumb screw 201 which is threaded through the rear end of slide block 200 and seated within a mount 202. The tool also may be made adjustable longitudinally of the bottle by making block 200 in two parts with provision for extending one relative to the other. Mount 202 is welded or otherwise affixed to the upper end of an arcuate segment 203 which is centered upon the chuck axis. The segment preferably is made in two parts so that the mount can be adjusted to position tool 16 circumferentially of the chuck where desired. For this purpose, an outer part 204 of the segment slidably embraces an inner part 205. The outer part is slotted at 206—206 and a plurality of spaced, tapped holes provided in the inner part 205. A pair of bolts 208 pass through the respective slots in the outer part of the segment and thread into selected tapped holes 207 to clamp the two parts of the segment together.

The end of the segment opposite mount 203 has a hub 210 affixed to it, the hub being keyed to the upper end of a shaft 213. It will be noted from Figures 13 and 14 that shaft 213 is canted with respect to the vertical so that when it is revolved in the direction indicated by the arrow in Figure 13, tool 16 is both retracted and lowered away from lug engaging position in order to clear the tool out of the way of the screen. The shaft is pivotally mounted in journal block 214 which is affixed to the front of the frame 26, the bearing portion of the journal being canted with respect to its base 215 in order to accommodate shaft 213.

Figure 15:
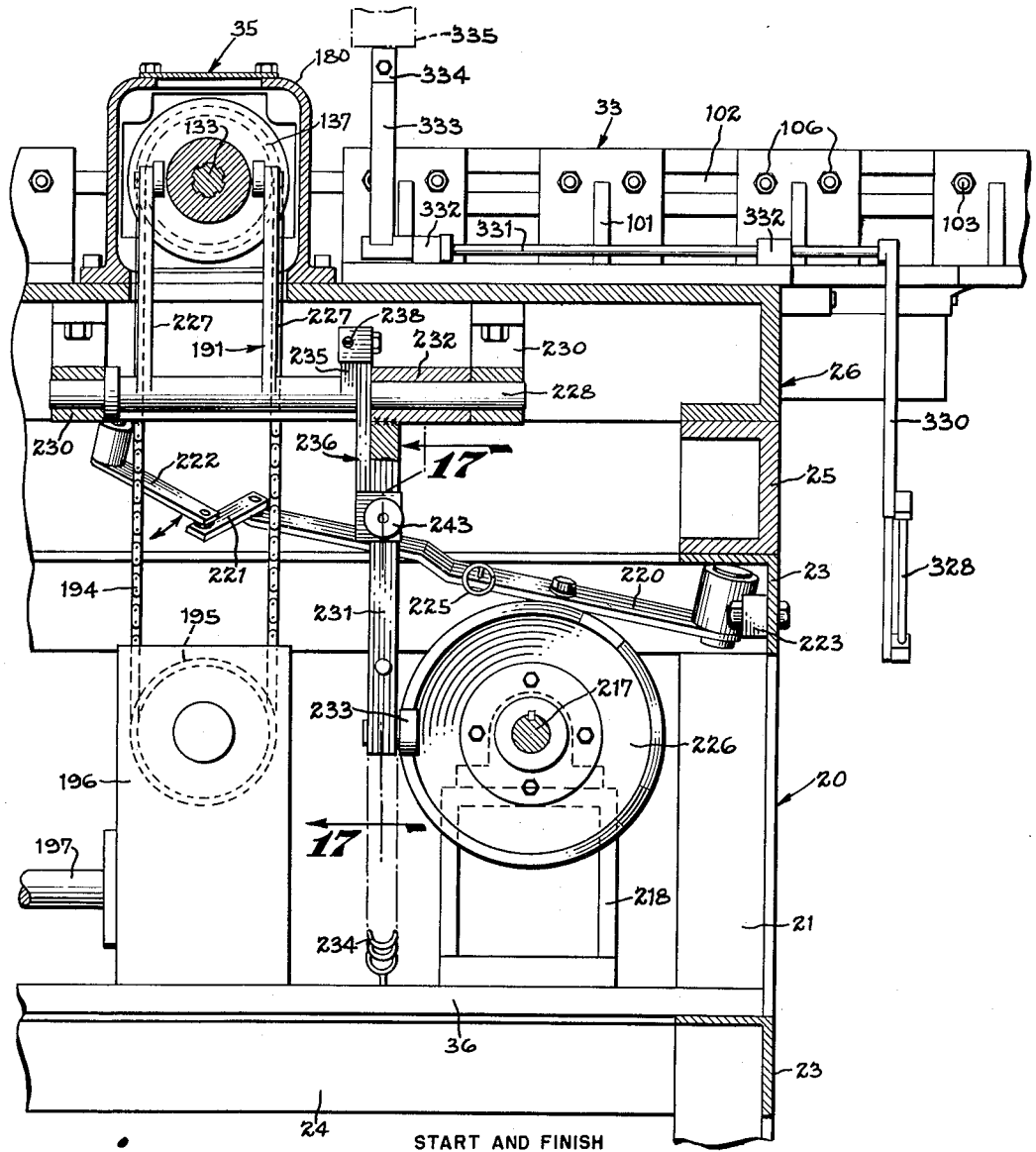
Figure 15 is a cross sectional view taken through the left side of the machine looking from the back toward the front illustrating in particular the drive for the final registration station and the linkage for moving the bottle aligning tool at this station to and from lug engaging position.
Figure 16:
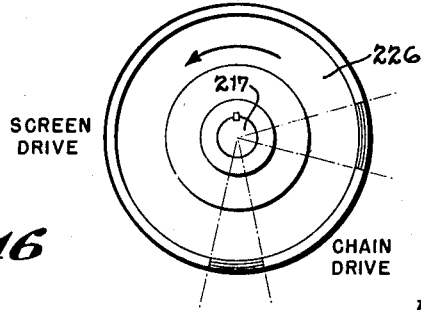
Figure 16 is a diagrammatic elevational view of the cam which controls the shifting of the clutch member at the final registration station.

The rotation of shaft 213 is controlled by a face cam 216, see Figures 5 and 15. This cam is keyed to a shaft 217 which extends from the back toward the front along the left side of the machine unit, being journaled on a pillow block 218. The linkage from the cam to the shaft comprises a cam lever 220, a link 221, and a crank arm 222. Cam arm 220 is pivotally journaled in a block 223 which is bolted to the upper side rail 23 at the left side of the machine unit. The end of the lever opposite the pivot is connected by link 221 to the outer end of the crank arm 222, the crank arm being keyed to the lower end of shaft 213. Near the journaled end of the cam lever, a roller 224 is mounted on the underside of the lever. Because of the canted relationship of the shaft 213, the track of the face cam 216 must be beveled. Cam roller 224 is held in track engaging position by a heavy spring 225 which is hooked onto cam lever 220 and extends toward the rear of the machine where it is fastened to a frame member. It will be seen from Figure 15 that as cam 216 rotates, arm 220 is caused to swing back and forth, which, in turn, causes crank arm 222 to swing tool 16 into and out of lug engagement position.

Shaft 217 has a second cam 226 keyed to it which controls the shifting of clutch yoke 191. The yoke includes a pair of arms 227 which are welded to a shaft 228 and extend up from it through an opening in frame 26 into the final registration case 180. The shaft is rotatably mounted in a pair of spaced journaled blocks 230 which are bolted to the underside of frame 26. The cam lever for shifting clutch yoke 191 is indicated at 231. It has a hub 232 welded at its upper end which is journaled on shaft 228 so that it can turn freely. The lower end of lever 231 carries a cam roller 233 which is positioned to ride the track of face cam 226, being held against the track by a spring 234 which is hooked onto the lever and extends toward the front of the machine where it is anchored to the stand.

Referring now to Figures 15 and 17–19, shaft 228 has a lug 235 welded on it which extends upwardly from it near hub 232. Between the hub 232 and the lug a clutch adjusting frame 236 is loosely journaled on shaft 228. The portion of the frame above shaft 228 has a pair of ears 237 welded to it which loosely embrace the sides of lug 235. Each ear has a set screw 238 seated in it, so that the angular position of the lug relative to the frame may be adjusted. In addition, an arcuate slot 240 is cut through the frame between the ears and centered upon shaft 228. The frame is locked to the lug by a bolt which extends through the arcuate slot and threads into the lug. This construction permits an initial adjustment in setting up the machine unit in order to correctly position clutch yoke 191 with respect to cam lever 231.

Beneath shaft 228, frame 236 has a pair of arms 241 which extend from it at opposite sides. At the outer end of each arm and on the side of the frame opposite the ears, a screw block 242 is affixed. Both of these blocks are drilled and tapped on a common axis and in each block a threaded bushing 243 is journaled, with the outer end of each bushing knurled to facilitate manual adjustment of the bushing in the block. A pin 244 is slidably journaled in each of the bushings. The pins extend toward one another with their inner ends extending through bores in a pair of spaced lugs 245. Referring to the left one of the pins as shown in Figure 17, a light coil spring 246 surrounds the pin and is seated between the inner end of the bushing 243 and a collar formed on the pin. The spring thus serves to urge the pin inwardly. The clutch adjusting frame is positioned so that the cam lever 231 depends between the two lugs 245 where it is engaged on opposite sides by the inner ends of the respective pins 244. As shown in this figure, cam lever 231 is swung in a clockwise direction by cam 226 and in the opposite direction by spring 234. When the lever is moved in the clockwise direction, clutch yoke 191 is shifted to engage drum 141 and shaft 133 and thus connect the chuck at this station with the chain drive from gear box 196. In swinging in this direction, the cam lever tends to compress the comparatively light spring 246 so that clutch pressure established between drum 141 and clutch member 137 is dependent solely upon the force of the spring. Thus, in the final alignment of a bottle, when tool 16 is engaged by a lug 14, any drive from gear box 196 in excess of that required to bring the bottle into final alignment position can be dissipated by adjusting spring 246 to allow slipping to occur between drum 141 and shiftable clutch member 137. The knurled bushing 243 at the light-spring side of cam lever 231, therefore, provides a convenient way of adjusting the sensitivity of the final aligning station wherein a balance can be established in the torque force of the chuck, the force being set sufficiently high to insure positive alignment but less than a force which would cause the tool to break or chip the lug 14.

On the other side of cam lever 231, the right side as shown, a shorter and much heavier spring 248 is seated between the inner end of bushing 243 and the collar 247. The heavy spring 248 is compressed when the cam lever 231 is swung in a counterclockwise direction, as viewed in Figure 17, under the action of cam spring 234. This movement results in a shifting of clutch member 137 to disconnect the drive from drum 141 and connect it to shaft 183. The connection established under the pressure of spring 248 between the shiftable clutch member 137 and shaft 183 must be a positive one which permits no slipping to occur, since this connection joins the screen drive with the chuck through wire cable 193 to rotate the bottle with screen movement; hence, the heavy spring on this side of the cam lever. The two collars 247 on the pins, preferably rest against the respective lugs 245 so that the heavier spring does not affect the action of the lighter one.

*Screen drive*

Reference is now made to Figure 3 of the drawings which shows the back of one of the machine units. The screen drive mechanism is centered behind station 6 in the unit and is supported by framework which includes the two end bells 27—27 and the top support plate 28. The two end bells are bolted onto the top of frame 26 and the two ends of support plate 28 are bolted to them. The framework thus provided is open at the front and back. Across the front of this structure is mounted a pair of track elements indicated generally at 250. Each track element comprises an elongated rectangular plate 251 which has its forward and rear edges grooved to provide seats for track strips 252. There are two such plates (see Figures 20, 26 and 27), one mounted directly above the other in spaced relationship. The plates are supported near their two ends by angle brackets 253 which are bolted to the fronts of the respective end bells. Generally, each track element has a screen carriage 254 mounted upon it by rollers. These carriages are substantially identical and will be described in detail below.

Figure 24:
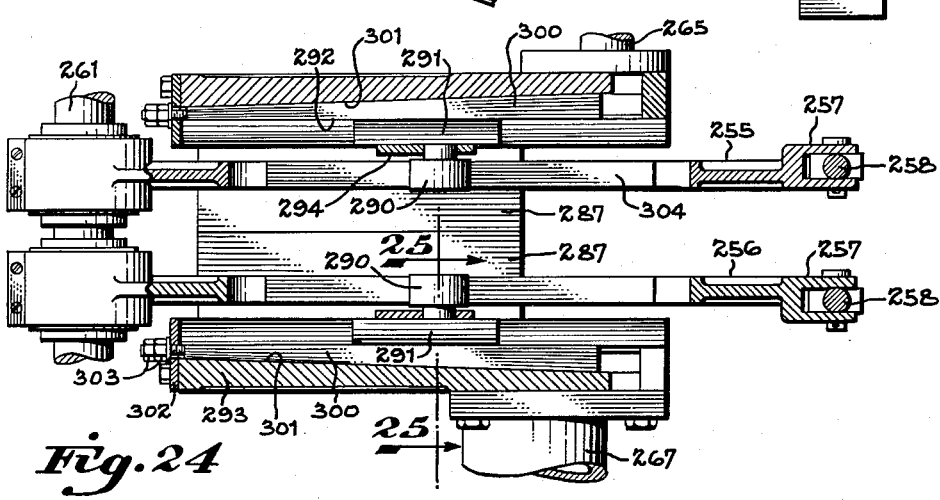
Figure 24 is a longitudinal cross sectional view through the breastplate assembly.
Figure 25:
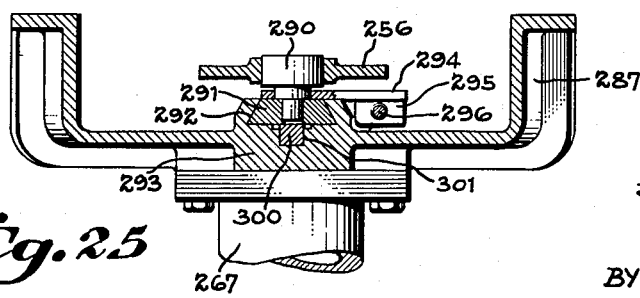
Figure 25 is a fragmentary lateral cross sectional view through the lower half of the breastplate assembly taken on the line 25—25 in Figure 24.

The drive mechanism for both carriages is mounted within the space between the end bells, with an upper rocker arm 255 and a lower rocker arm 256 extending forwardly from it. Each rocker arm terminates at a fork 257 which is pinned to one end of a connecting rod 258. In each instance, the other end of the connecting rod is pivotally connected to a carriage between plates 260 bolted to one side of the carriage, the plates being spaced to receive the end of the connecting rod. Each rocker arm is pivotally mounted up on a shaft 261 which is mounted vertically at the rear end of the machine. See Figures 20 and 24. The lower end of this shaft is seated in a bracket 262 which is bolted to frame 26 and extends outwardly from it at an angle to overhang the rear of the machine. Support plate 28 also extends outwardly over the rear of the machine and has a bearing 263 directly above bracket 262 for journaling the upper end of shaft 261. With this mount both rocker arms can swing horizontally in an arc centered upon shaft 261.

Swinging motion is imparted to the two rocker arms by a breast plate assembly 264 which is mounted between the end bells. The breast plate assembly has a vertical stub shaft 265 fixed to the top of it adjacent its forwarding end, the upper end of the stub shaft being journaled within a bearing 266 seated in support plate 28. The under side of the breast plate assembly has a tube 267 bolted to it, the tube being vertically disposed and parallel with the axis of stub shaft 265. The lower end of the tube is welded to a plate 268, which plate is bolted to a crank 270. Crank 270 seats a second stub shaft 271 which is directly below stub shaft 265 and axially aligned with it. Stub shaft 271 at its lower end is pivotally mounted within a bearing 272 which is bolted to a supporting frame member 273. This member is bolted at one end to a bed plate 274 and at the other end to a hanger 275. The hanger at its upper end is bolted to the side of the right end bell 27 and also serves to support one end of bed plate 274. The opposite end of the bed plate is bolted to the under side of the upper one of the two side rails 23 at the left end of the machine unit.

The underside of the crank 270 has a bracket 276 affixed to it which mounts a cam roller 277 journaled underneath it. See Figures 20 and 21. Support frame 273 is cut out to accommodate the bracket and the roller so that the roller depends into the space between the support frame 273 and the bed plate 274 where it rides the periphery of an eccentric cam 278. The roller is biased into cam engaging position by means of a spring 280 which is mounted on a rod 281. The rod has a fork 282 affixed at one end which is pinned to the end of crank 270 opposite stub shaft 271. The rod 281 is slidably mounted in a pierced wall 283 which may be formed as part of support frame 273. The spring 280 surrounds the portion of rod 281 which is on the side of wall 283 opposite fork 282. A nut 284, turned onto the extended end of the rod, serves to compress the spring between it and the wall, thus biasing crank 270 in a clockwise direction looking down upon it, to urge roller 277 against cam 278. The cam is driven from a gear box 285 which is bolted to the underside of the bed plate 274 with a drive shaft 286 for the cam extending up from the gear box through an opening cut in the bed plate. It will be seen that as cam 278 rotates, the breast plate assembly 264 will be caused to oscillate on the axis defined by the two stub shafts 265—271.

Figure 23:
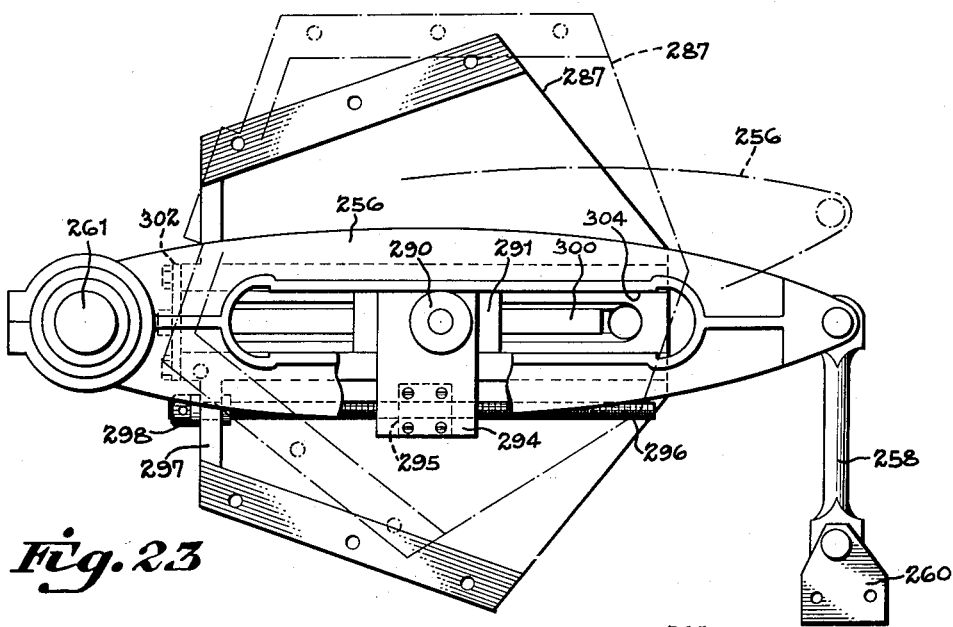
Figure 23 is a plan view of the lower half of the breastplate assembly which drives the screens.

The breast plate assembly is made in two, substantially identical, upper and lower halves. Each half, the lower one of which is shown in Figure 23, includes side walls 287 which flare outwardly from back to front, and which are flanged with the respective flanges fastened together by bolts 288 to provide a housing structure open at the front and back. Driving connection is made between each half of the assembly and one of the rocker arms, the lower half driving the lower one 256, and the upper half driving the upper rocker arm 255 by means of rollers 290. In each instance, the roller is journaled upon a slide block 291 which has slanting sides adapted to fit a dovetail groove 292 cut in a center rib 293 extending longitudinally of the particular half of the assembly. Each slide block has a plate 294 bolted upon it which extends off to one side of the rib 293 and which has a screw block 295 bolted to it. Each screw block is threadably engaged with an adjustment screw 296, the screw being journaled at its rear end in flange 297 extending across the rear of the breast plate half. Outside the flange a nut 298 is pinned to the end of the screw so that a wrench can be used for turning it so as to position the slide block 291 longitudinally of the assembly. The slide block can be locked in position after being adjusted by a wedge 300 which is seated within a slanting groove 301 milled into the longitudinal rib 293 in the bottom of the dovetail groove 292. See Figure 24. The rear end of each wedge 300 has a threaded stud affixed to it which extends through a bore in an end plate 302 bolted across the rear end of the dovetail groove 292. A set of lock nuts 303 on the stud outside the plate permits the wedge to be drawn up tight and locked to fix the longitudinal position of the slide block and consequently the roller 290 carried by it.

Each one of the rollers 290 is engaged within a slot 304 cut longitudinally of the rocker arm which it drives. It will be observed, that if one of the rollers is moved to the forward end of the breast plate assembly in vertical alignment with the axis about which the assembly oscillates, no motion is imparted to the rocker. However, as the roller is moved rearwardly away from this center of oscillation, the swinging motion imparted to the rocker arm is steadily increased. This construction permits the throw of the rocker arms to be adjusted independently of one another.

*Squeegee drive*

The two squeegees which are used for decorating the body portions and the neck portions of the bottles in the machine unit are mounted on a frame 306. See Figure 3. The frame is pivotally mounted between the two end bells 27 just ahead of the vertically disposed tube 267 which supports the breastplate assembly 264. The frame includes a pair of arms 307 which extend rearwardly at the sides of the frame parallel with the end bells, each arm of which seats a threaded stud 308 near its ends. The two studs are on a common axis and each has its outer ends seated in a bearing which is mounted within a housing 310 bolted to the wall of the adjacent end bell. A lock nut 311 on each of the threaded studs 308 serves to position the frame 306 correctly with respect to the center line on which the squeegees carried by it must swing, which line coincides with the axis of rotation of chuck 160 of the final registration mechanism.

The squeegee frame is raised and lowered, i. e., pivoted on the axis of threaded studs 308, by means of a connecting rod 313. The upper end of the connecting rod is pinned to the left side of the frame as viewed in Figure 3 and the lower end of the rod is pinned to the forward end of crank arm 314, which arm is keyed to the right end (as shown in this figure) of a shaft 315. This shaft is rotatably mounted in a pair of spaced journal blocks 316 which are bolted at the top of frame 26. Shaft 315 extends parallel with the back stop structure 33, and behind the pre-registration station case 130, cam lever 317 is keyed to it, the lever depending in to the space below the frame. The lower end of lever 317 has a cam roller 318 journaled on it which rides the track of a face cam 320. This cam, as will be seen in Figure 6, is keyed to shaft 62 which also carries the rack index and lift cams, and the opener cam. The lever 317 is biased to maintain roller 318 against the face of cam 320 by a spring 321 which is linked to it and extends toward the rear of the machine where it is anchored to the frame by means of a bracket 322. It will be seen that as cam 320 rotates shaft 315 will be caused to oscillate raising and lowering frame 306 once for each revolution of the cam.

In the operation of a machine utilizing a squeegee-screen combination for the decoration of ware, it has been found desirable to provide some safety means to insure that the squeegee is not forced down upon the screen unless there is an article beneath the screen to absorb the squeegee pressure. A novel safety device of this character is provided in the present machine unit and is shown in Figure 4 of the drawings. The cross sectional view of Figure 9 illustrating the mouthpiece which is used at stations 2 and 6 shows that the receiver 97 is spring urged toward the backstop structure. If the opener base 111 is moved in without there being a bottle at station 6, the stem 92 remains as shown in this view. At station 6, the stem is modified slightly (see Figure 4) in that it is continued beyond lock nuts 98 and has a grooved wheel 323 mounted at its outer end. Directly below this wheel, a yoke 324 is keyed to the right end of a shaft 325. The yoke extends up from shaft 325 and engages the grooved wheel. The shaft is journaled on spaced blocks 326 which are bolted to the top of the opener base plate 111, and extends from the yoke toward the left side of the machine where it has a crank arm 327 pinned to it. The crank arm depends through a slot cut in the opener base plate and is pinned to a tie rod 328 which extends rearwardly along the left side of the machine. The rear end of tie rod 328 is pinned to a second crank arm 330 which depends from a horizontally disposed shaft 331 journaled in a pair of bearing brackets 332 mounted on the top of the back stop bracket behind stations 7—10. Shaft 331 parallels shaft 325 and has a stop bar 333 pinned to its right end. This stop bar extends upwardly from the end of shaft 331 adjacent the left end of the squeegee frame 306, as viewed from the front. The upper end of the stop bar 333 has a hardened metal bit 334 bolted to it which is adapted to engage the under side of an arm 335, which is disposed at the left side of the squeegee frame 306, when stop bar 333 is shifted toward the rear as viewed in Figure 4. This can only occur when base plate 111 is translated inwardly and the receiver 97 at station 6 does not make contact with a bottle. The normal in and out movement of the opener base plate 111 causes swinging motion to be translated to stop bar 333. However, this swinging motion stops short of positioning the hardened metal bit 334 under the frame arm 335 if the stem 92 in the mouthpiece at station number 6 is moved outwardly, relatively speaking, by bottle contact. With stop bar 333 out from under the frame arm 335, the squeegee frame can come down to a point where contact is made between squeegees and the screens. It will be observed from Figure 6 of the drawings that downward swinging motion of the squeegee is under the force of spring 321 of cam lever 317. Or, in other words, when a stop bar 333 is in position to contact arm 335 on the screen frame, it works against the force of spring 321.

It has also been found expedient to provide means for locking the squeegees out of operating contact with the screens during trail runs of the machine unit where adjustments are being made, or at other times when the unit is being run without ware in it. The lockout comprises, in general, a shiftable lever 336, a shaft 337 and a toggle link 338. The shiftable lever is keyed to the forward end of shaft 337 at the front of the machine. The forward end of the shaft is journaled in a bearing 340 which is bolted to the lower one of the two front cross rails 22 of the stand 20. The rear end of shaft 337 is journaled in a block 341 bolted to the front of bedplate 36. Just ahead of the front line of frame 26, an arm 342 is welded to shaft 337, this arm being pinned to the lower end of toggle link 338. As shown in Figure 6a, when shiftable lever 336 is thrown to the right, looking at the front of the machine, shaft 337 is rotated clockwise to swing arm 342 over center with respect to toggle link 338. The upper end of the toggle link is slidably embraced in a guide 343 which is bolted to the front of the frame 26 directly above the center line of shaft 337. The upper end of the toggle link 338 extends above the top of the frame 26, in position to engage the underside of a crank arm 344 which is keyed to squeegee lift shaft 315 and which extends forwardly from it to overhang the front edge of frame 26. With toggle link 338 in a raised position, crank arm 344 is lifted to rotate shaft 315 in the squeegee lift direction and consequently turn cam lever 317 with it so that roller 318 is moved away from the track of cam 320. This, in effect, locks the squeegee in raised position so that it can not be lowered even though the machine unit is running and cam 320 is turning. The swing or throw of shiftable lever 336 may be limited by a pair of spaced lugs 345 such as those shown on block 341 in Figure 6a, these lugs being in positions to contact a pin 346, set in shaft 337, at the ends of the effective movement of lever 336.

The squeegees themselves, may be mounted upon a conventional support arm such as the one shown at 347 in Figure 20. The arm is pivotally mounted upon the forward end of frame 306 and centered over the final alignment station. The details of construction of the arm 347, the means by which the squeegees are attached to it are not shown here, since they may be conventional ones, well known to those skilled in the art.

*Screen carriages*

Attention is now directed to Figures 20 and 26 through 30 of the drawings which show the screen carriages 254. Each carriage rides one of the pairs of track strips 252 in front of the framework which houses the squeegee frame 306 and the breastplate assembly 264. The tracks are diamond shaped in cross section as shown in Figure 20, and each carriage mounts four rollers 348 which have V grooves cut in them to fit the tracks. Each of the front pair of these rollers is journaled on straight bearing pins 349. The rear rollers, however, are journaled on crank shaped pins 350. Each of the latter pins has an arm 351 pinned to it which is biased by a spring 352 in the direction which swings the roller into engagement with the rear track strip. This arrangement insures correct alignment between carriages and tracks and also makes it possible to remove the carriages easily.

Both carriages may be identical, the upper one mounted above the tracks on which it rides and the lower one mounted below its tracks. The rollers 348 on the upper one thus are journaled on the underside and the ones on the lower carriage journaled on the upper side, see Figure 20. The lower carriage, as seen in this figure, mounts the screen which decorates the body portions of bottles and is driven by rocker arm 256. This carriage also has a bracket 353 bolted to it, which anchors the ends of cable 193 (Figure 26) by which the chuck 160 at the final registration station is driven when the shift is made to engage clutch member 137 with clutch plate 186.

The cable is guided and aligned horizontally with bracket 353 by a pair of pulleys. One of the pulleys, indicated at 354 in Figure 26, is rotatably mounted at the left side of the machine units in a fixed journal 355 bolted to the side of the left end bell 27. The other pulley is at the right side of the other end bell and preferably is journaled in an adjustable slide 356 so that the cable can be tightened or otherwise adjusted when necessary. The cable ties in the movement of the lower carriage with the rotation of the bottle so that rolling contact is made between the screen and bottle surface. The upper carriage, which is driven by rocker arm 255, carries the screen which decorates the neck portions of bottles. The lesser diameter of the neck portions requires this carriage to move at a proportionally slower speed than the lower one. This is done by adjusting the position of the upper roller 290 (Figure 24) so that it is closer to the axis about which the breastplate assembly oscillates than the lower roller, as was pointed out above.

The rear portion of each carriage is cut out between rear rollers 348 to accommodate the forked end of the rocker arm and the connecting rod 258. The forward edges of the carriages, at the two sides are milled to provide dovetail slides 357 which mount the respective screen supporting bracket, the upper bracket being indicated at 358 and the lower one at 359. Each bracket has a pair of dovetail grooves which are designed to engage the slides 357. Preferably the brackets are slit horizontally at the grooves with the parts at the sides of the slits adapted to be drawn together by bolts to securely clamp the dovetail slides 357 between them.

Figure 27 shows the front of the two brackets, the squeegees being omitted for clarity. Both are arranged so that the height of the screens can be adjusted to accommodate bottles of various sizes. Also both screens can be shifted forward and backward, longitudinally of bottles. In addition, the screen which decorates the body portions of bottles is adjustable angularly. Provision is also made for raising each of the screens from bottle engaging position. The latter is done in each bracket by rotating a shaft 360 which extends horizontally across the bracket, being journaled in blocks 361—361 which depend from the respective ends of the bracket. The shaft has a pair of pinion gears 362 on it, one within each block, each of which meshes with a gear rack 363 fixed to a slide 364. Fine vertical adjustment is made within each of the slides. The slides are made in halves which can be adjusted relative to one another by a thumb screw 365 which is rotatably seated on the inner one of the two halves and threadedly engaged with the outer one. In the bracket which mounts the body screen, the outer half of each of the slides depends below the lower end of the block in which it is mounted and has a bracket 366 fastened to it at its lower end to which the screen is affixed. Longitudinal shifting adjustment is made within the latter brackets, a dovetail slide 367 being provided for this purpose. For the other, or neck screen, longitudinal shifting adjustment is made within a bracket 368 affixed to the outer half of the slide 364, this bracket having a horizontally disposed dovetail slide 369 in it. The neck screen is mounted upon a foot 370 which is affixed to a rotatably mounted block 371 carried on an angulated arm 372 which depends from bracket 368. The angular position of the foot 370 is adjusted by a thumb screw 373 which is rotatably journaled on arm 372 and threaded into block 371 at one side of its pivot axis. The specific details of the parts of the brackets just discussed are not described since they may follow conventional construction, well known in the art.

The radiant heating elements which are required to keep the thermo-responsive vitreous coloring compositions utilized in the present machines in a liquid state, are not shown here. However, it will be understood that they may be secured to the screen mounting brackets and directed onto the screens from above in the manner disclosed in the copending application which is referred to above.

*Drive and timing*

Figure 31:
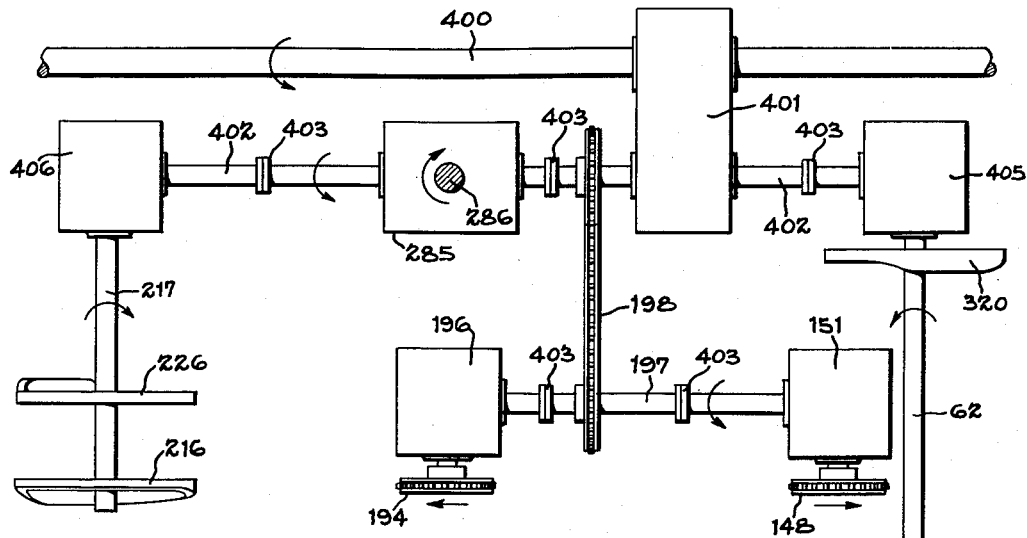
Figure 31 is a diagrammatic view illustrating the drive for the various parts of the machine.
Figure 32:
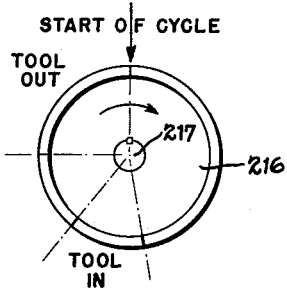
Figure 32 is a diagrammatic front elevational view of the cam which controls the movement of the tool at the final alignment station.

The general layout of the drive for the various parts of the machine is shown diagrammatically in Figure 31. This view is laid out as if one were looking at the parts from above, with front of the machine unit at the bottom of the drawing.

In a typical installation, since all units of the machine operate together, it is preferred that the units be driven from a common drive shaft 400 which extends along the back of the machine. Power is taken from this shaft at each of the units by a gear box such as that indicated at 401. The drive may be a chain and sprocket linkage if desired. Parallel to shaft 400, and extending across the back of the machine unit, is a shaft indicated generally at 402, this shaft comprising segments which are joined by coupler elements 403. Near the center of shaft 402, the gear box 285 is located. This box is the one which is bolted to the underside of bed plate 274 and has eccentric cam keyed to its shaft 286 which extends out of the top of the box. Preferably, the gear box is constructed so that shaft 286 turns at one-half of the speed of the other two shafts, 62 and 217, in the machine unit which carry cams. The reason for this, is that the screens are designed to reciprocate, making only one pass for each complete cycle of the other parts of the machine unit so that they return to a starting point only after cam 278 has made a complete revolution.

At the right side of the diagram, shaft 62, which carries the squeegee operating cam 320, the rack index cam 66, the rack lift cam 61, and the opener cam 128, is shown. This shaft extends toward the front of the machine from a gear box 405 which is driven from shaft 402. At the other side of the diagram, shaft 217, which carries the final registration clutch shifting lever 226 and the tool operating cam 216, is shown. This shaft extends toward the front of the machine from a gear box 406 also driven by shaft 402. Both gear boxes 405 and 406 thus are driven at the same speed so that shafts 62 and 217 turn at the same speed, making one revolution per cycle of the machine unit. Between the two cam carrying shafts, gear boxes 151 and 196 are located. These two boxes are interconnected by shaft 197, which shaft is driven by a sprocket and chain set 198 from shaft 402. Coupling units such as those shown at 403 may also be utilized in shaft 197.

The specific shapes of the cams are shown diagrammatically in Figures 16, 22 and 32 through 36. Since captions are used in these views to indicate what operations are controlled by the various portions of the cams, it is believed that a detailed description of each one of them is not needed. These figures also are tied-in with Figure 37 which illustrates the timing of the entire machine unit and what takes place at each point during the cycle. In the diagram of Figure 37, one circle or arc is provided for each of the cams of the machine and the cam reference numerals are used to identify them.

Figure 33:
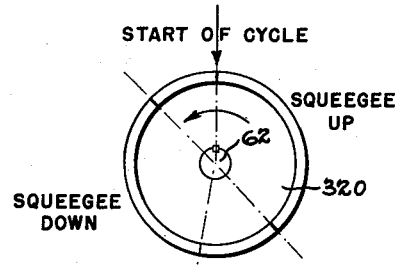
Figure 33 is a front elevational view of the cam which controls the movement of the squeegee.
Figure 36:
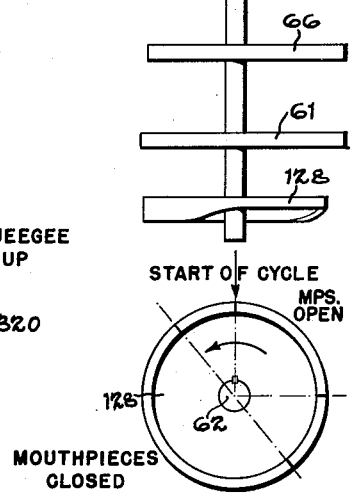
Figure 36 is a diagrammatic elevational view of the cam which controls the opening and closing movements of the mouthpiece.
Figure 34:
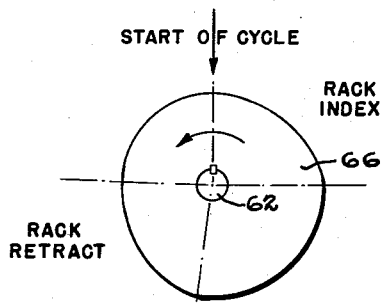
Figure 34 is a diagrammatic elevational view of the cam which controls the indexing movement of the rack.
Figure 35:
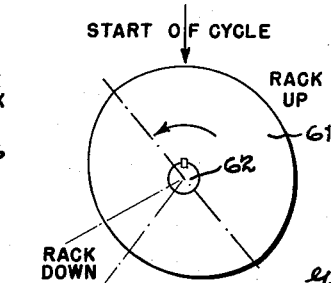
Figure 35 is a view similar to 34 showing the cam which controls the raising and lowering of the rack.

Thus, starting at the outside of the diagram, the squeegee cam 320 has the four parts of its cycle outlined, and by comparing these parts with the showing of the cam in Figure 33, it will be seen that the arrows on the circle are at the places where the dot-dash lines of Figure 33 indicate changes in the cam track. Moving in from the squeegee circle, the tool operating circle 216 is next. Then the final registration clutch control cycle is shown as an arc 226. Just in from 226, the circle representing cam 128 which controls the opening and closing of the mouthpieces, is shown. Inside of this circle, the rack lift cam circle 61 appears. Next is the rack index cam circle 66, and at the center of the diagram, the screen carriage stroke cycle is shown as an arc 278. Since the latter cam travels at only one half the speed of the others, the circle segment indicates movement of the screen in one direction only.

Following the operation of the machine unit through one complete cycle and starting at a point when the rack is lifted and in retracted position, the other moving parts are positioned with the squeegee up, the final registration tool out of lug engaging position and the mouthpieces open. Thus, the bottles in the machine are resting on the rack ready to be moved ahead one station. The rack then indexes to carry the bottles to the new station, whereupon, the mouthpieces start closing, the tool at the final registration station starts moving in and the final registration clutch member 137 is shifted to drive the bottle chuck 160 from gear box 196. At this time the rack is stationary in bottle supporting position at the forward end of its travel. When mouthpieces are completely closed and holding the bottles against the back stop structure 33, the rack starts lowering. By this time the tool at the final registration station has moved into lug engaging position and the squeegee starts to move down toward the screen. Just before the tool moves out of lug engagement position, the final registration clutch is shifted by cam 226 to change the drive from gear box 196 over to shaft 183 so that chuck 160 is ready to be driven through wire cable 193 from the lower screen carriage. Just after the squeegee contacts the screen, tool 16 at the final registration station is retracted to a point where it is clear of lug 14 on the bottle. This point in the cycle coincides with the start of the screen carriage stroke. During the screening, the rack is down and retracting, the mouthpieces closed and tool 16 out of operating position. Of course, during the stroke, the squeegee is down on the screen. At the end of the screening stroke, the squeegee starts rising, the mouthpieces opening, and by this time the rack is again in position to receive the bottles when they are released by the mouthpieces, thus completing the cycle.

*Let-down and take out mechanism*

Preferred mechanisms for placing the bottles upon the rack at the right end of the machine and removing them from the rack at the left end is shown in Figures 38 through 43. The drives for both of these mechanisms is taken from the main drive shaft 400 through chain and sprockets linkages to be described below. Direct interlinkage with the main drive shaft is preferred because it simplifies the problem of synchronizing the movements of these two mechanisms with the movements of the rack. In general, the let-down mechanism is disposed at the discharge end of the conveyor belt 11. In the instance shown, the bottles are received and lowered by a cradle, indicated generally at 410, which is pivotally mounted as at 411, to swing about the axis of the drive shaft 412 of the conveyor. The cradle swings between a position in which it is approximately 45° to the horizontal, and a position in which it is substantially horizontal.

The drive for the conveyor belt 11 is synchronized with the movement of the cradle so that the cradle is in the slanting position shown in Figure 38 ready to receive a bottle each time that one arrives at the discharge end of the conveyor belt. In the arrangement shown, the bottles tip over and fall into the cradle and are then lowered by it onto the first bottle carrier at the left end of the rack. The equal spacing of the bottles upon the carrier 11 is determined by the star wheel spacer discussed above.

The let-down mechanism and conveyor may be mounted upon a frame of the type shown generally at 413. The shaft 412 is mounted between pillow blocks 414 which are bolted to the top of the frame adjacent its front end. Shaft 412 has a sprocket 415 keyed to it which is in driving connection with a chain 416. The chain also passes around a sprocket 417 which is keyed to a shaft 418 mounted in a journal block 419 bolted to the lower portion of frame 413. Shaft 418 also carries a sprocket 420 which is in driving connection with a chain 421. This chain preferably passes around a sprocket not shown but which is similar to the one 420 and keyed to main drive shaft 400. Thus, the drive to conveyor belt 11 is a direct one, the desired speed for belt movement being obtained through the gear ratios of sprockets 415, 417 and 420.

Shaft 418 also has keyed to it another sprocket 422 which is linked by chain 423 to a sprocket 424. The latter sprocket drives a gear box 425 which has a face cam 426 pinned to a shaft extending from its top. A cam roller 427 rides the track of face cam 426, the roller being journaled upon a cam lever 428. One end of this lever is pivotally journaled on a post 430 and the other end pivotally connected to the lower end of a tie rod 431. The tie rod at its upper end is connected to cradle 410 so that as face cam 426 rotates, the tie rod is caused to move up and down thus swinging cradle 410 about its pivot. The cam roller 427 may be held against the track of face cam 426 by a helical spring such as the one shown at 432.

The proper speed of rotation of the face cam is obtained at gear box 425 which provides one revolution for the face cam in each cycle of the machine. The face cam itself is shown in detail in Figure 39. By comparing this figure with Figures 34 and 35 which show the two rack cams, it will be seen that the cradle lowers when the rack is completely retracted. Preferably, the cradle moves down past the bottle carrier which is at the left end of the rack so that the bottle is transferred from the cradle to the carrier as one passes the other. It will also be seen that the upward movement of the cradle is begun after the rack has started to index so that the bottle just deposited upon the rack is out of its way.

It is found that the let down mechanism disclosed here lends itself well to the high speed production rate of which the machine is capable. The first portion of the bottle travel is by gravity, the bottle simply falling into the cradle. From this point the bottle is lowered rapidly to where it is ready to hit the carrier. At this point the movement is decelerated so that it is deposited gently onto the carrier.

At the other end of the machine the process is reversed. The bottles are picked up out of the last carrier on the rack, shown at 433 in Figure 42, and swung through approximately 90° from the horizontal to the vertical position by means of a cradle, indicated generally at 434. This cradle is mounted upon an arm 435 which is secured to the side of a sprocket wheel 436. The sprocket is pivotally journaled on the side of a bracket mount 437 and caused to swing by means of a chain 438 which passes around the sprocket 436 having one end attached to a spring 439 and the other end linked to a swinging arm 440. When the arm is moved in the counterclockwise direction as shown in Figure 40, sprocket 436 is turned and arm 435 swung in the bottle raising direction as indicated by the arrow in this figure. The cradle is returned to the horizontal position by the spring 439 which has its lower end anchored to a frame 441 which mounts the take out assembly. Frame 441 may be made of angle iron like the main machine frame.

Preferably the drive for the take out mechanism also comes from main drive shaft 400 through a chain 442. The chain drives a gear box 444 which turns a face cam 445. A cam roller 446 is positioned to ride the track of face cam 445 being carried at the outer end of one arm 447 of a bell crank lever, the other arm of which constitutes arm 440 to which the driving chain to sprocket 436 is attached. The bell crank lever is pivotally mounted upon a shaft 448 journaled in a pillow block 450 which is bolted to frame 441. The face cam 445 is shown in Figure 41 and by comparing it with Figures 34 and 35 it will be seen that the cradle 434 is in position to pick up a bottle when the rack reaches the forward end of its travel and before it starts down. As shown in Figure 4 the last carrier 433 overhangs the left end of the rack so that when in bottle receiving position, cradle 434 is directly below it. When it swings up to pick up the bottle, it moves over an arcuate outer face 451 of bracket mount 347, the arcuate surface extending through the 90° swing of the cradle and serving as a support for the bottle.

Figure 42:
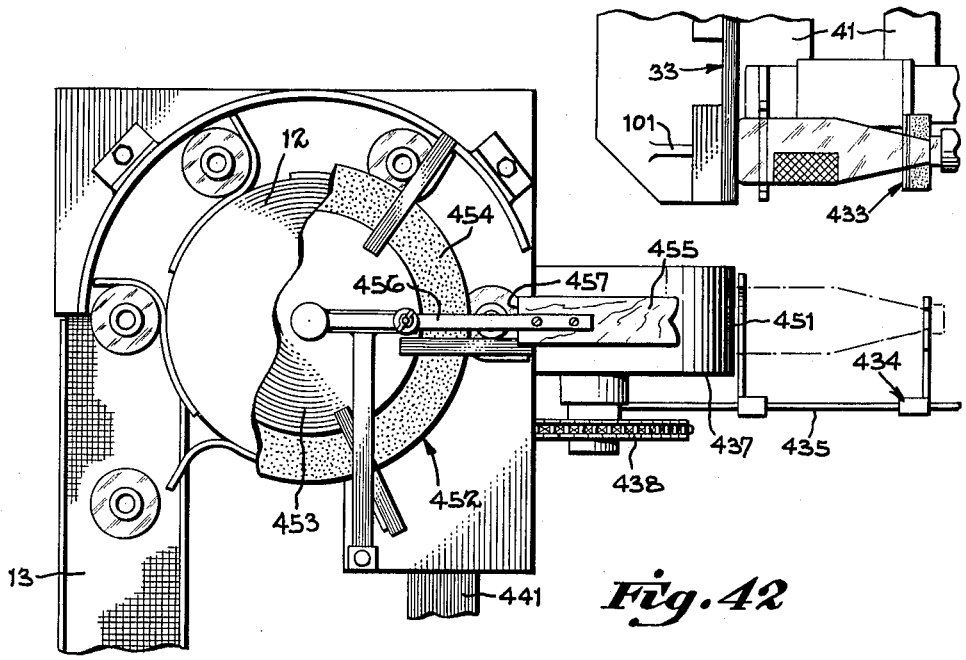
Figure 42 is a top plan view of the take out mechanism shown in Figure 40.

The speed of arm 435 must be fairly high in order to meet the production rate of the machine and upon reversal at the top of its swing the bottles are literally thrown from the cradle. In order to insure that the bottles are not broken and that they do not bound back toward the cradle, a receiver, indicated generally at 452, is provided for them. This receiver includes the star wheel 12 which is in position to contact the bases of the bottles; but in addition to wheel 12 a second star wheel 453 is provided which is at approximately the neck level of the bottles. The margin of the upper star wheel 453 is padded by annular segments 454, as shown in Figure 42, made of material such as fiber board, or the like, which is sufficiently rigid to withstand the shock of the bottles hitting against it but sufficiently resilient to insure that the bottles are not broken.

Figure 43:
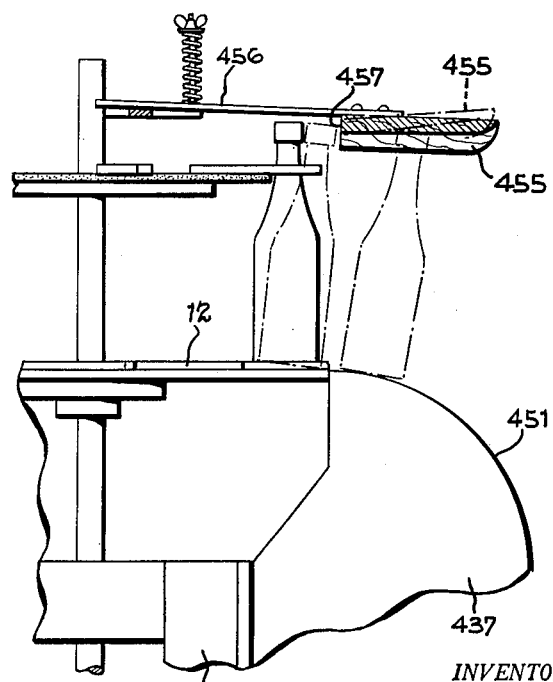
Figure 43 is a side elevation view showing the bottle receiver portion of the take out mechanism.

The high rate of discharge causes the bottles to bounce off the segments 454 and a wooden channel block 455 is provided for catching the necks of the bottles to stop the rebound. The under face of the block is grooved out as shown in Figure 43, the groove being less deep toward the rear than at the front. In addition, the block 455 is mounted upon a resilient arm 456 so that as a bottle is moved under it, the block raises to accommodate it, but as soon as the bottle is moved far enough toward the rear to clear the groove, the block snaps down into a position where its rear end 457, above the groove, is able to abut the top of the bottle and keep it within the arms of the star wheel. This action is shown in Figure 43.

Having described our invention, we claim:

1. In a decorating machine for applying color compositions to ware, ware handling means comprising, backstop structure extending longitudinally of said machine, translatable means disposed in spaced parallel relation to said backstop structure, said translatable means being substantially coextensive with said backstop structure and adapted for movement toward and away from said backstop structure, a plurality of equally spaced ware receivers associated with said translatable means, rigid ware indexing means disposed between the translatable means and said backstop structure, said indexing means adapted for substantially rectilinear movement in a plane paralleling the backstop structure in which a forward and backward motion is provided which is equal to the spacing between ware receivers.

2. In a decorating machine for applying color compositions to bottles, bottle handling means comprising, backstop structure extending longitudinally of the machine, a translatable slide mounted parallel with said backstop structure and adapted for movement toward and away from said backstop structure transversely of the machine, a plurality of equally spaced bottle mouthpiece receivers mounted upon said slide, and a bottle carrying rack mounted between the slide and the backstop structure for substantially rectilinear movement in a plane paralleling the backstop structure in which a forward and backward motion is provided which is equal to the spacing between mouthpiece receivers.

3. In a decorating machine for applying color compositions to bottles, bottle handling apparatus comprising, backstop structure extending longitudinally of the machine, a slide mounted parallel with said backstop structure, a plurality of equally spaced bottle mouthpiece receivers mounted upon said slide, drive means for moving said slide toward and away from said backstop structure into and out of bottle holding relationship with it in which bottles are clamped between receivers and the backstop structure, and means for moving bottles to successive receivers, said means including a plurality of cradles, and drive means arranged to move the cradles in unison in a path having a horizontal run equal to the distance between receivers, the drive means for the cradles being synchronized with the drive means for the slide, whereby the slide moves out of bottle holding relationship with the backstop structure at the start of said horizontal run and into said bottle holding relationship at the finish of said horizontal run.

4. In a decorating machine for applying successive color compositions to bottles, a bottle handling apparatus comprising, a plurality of aligned and equally spaced bottle mouthpiece receivers defining stations, a rotatable chuck disposed opposite a receiver at some of the stations, backstop structure disposed opposite the receivers at other stations, drive means for moving said receivers into and out of bottle holding relationship with said backstop structure and said chucks, and means for moving said bottles from station to station, said means operable when the receivers are out of bottle holding relationship with the backstop structure and the chucks.

5. In a decorating machine for applying successive color compositions to pieces of ware, ware handling apparatus comprising a plurality of stations in said machine defined by aligned and equally spaced ware receivers, backstop structure mounted in spaced parallel relationship opposite some of the receivers, a rotatably mounted chuck disposed opposite each of the other receivers, said receivers mounted upon translatable means adapted to move them in unison into and out of ware holding relationship with said backstop structure and said chucks, rigid rack means for moving ware from station to station, and means for operating said rack means when the receivers are out of said ware holding relationship.

6. In a decorating machine for applying color compositions to containers, container handling apparatus comprising, backstop structure, a slide mounted parallel with said backstop structure in spaced relationship therewith, a plurality of container receivers mounted upon the slide in equally spaced relationship and defining stations in the machine, said slide adapted for translatable movement toward and from said backstop structure to bring the receivers into and out of container holding relationship with said backstop structure, means for moving containers from station to station operable when said receivers are out of container holding relationship with the backstop structure, and said backstop structure being discontinuous at some of the stations to accommodate rotatable container receiving chucks having container registration mechanism associated therewith.

7. In a decorating machine for applying color compositions to containers, container handling apparatus comprising, backstop structure extending longitudinally of said machine, a plurality of container receivers mounted in spaced relationship relative to one another and in parallel spaced relationship with the backstop structure, said receivers adapted for translatable movement toward and from said backstop structure into and out of container holding relationship with said backstop structure, means for moving containers from receiver to receiver operable when said receivers are out of container holding relationship with the backstop structure, and said backstop structure being discontinuous opposite some of the receivers to accommodate rotatable container receiving chucks.

8. In a decorating machine for applying successive colors to pieces of ware, ware handling apparatus comprising, translatable means mounting a plurality of aligned and equally spaced ware receivers, backstop structure mounted parallel with said receivers in spaced relationship, said translatable means adapted to move toward and away from said backstop structure to bring the receivers into and out of ware holding relationship with said backstop structure, in which pieces of ware are clamped between receivers and backstop structure, and said backstop structure being discontinuous at places opposite at least two receivers to accommodate a rotatable chuck disposed opposite each of these receivers, and means for moving ware from receiver to receiver, said means operable when said receivers are out of ware holding relationship with the backstop structure.

9. In a decorating machine consisting of at least two substantially identical units disposed side by side for applying color compositions successively to bottles, bottle handling apparatus comprising, a plurality of horizontally aligned and equally spaced bottle mouthpiece receivers defining stations in each unit, rotatably mounted chucks disposed respectively opposite two of the receivers in each unit, backstop structure disposed opposite the other receivers in each unit, drive means for simultaneously moving said receivers in both units toward and away from bottle holding relationship with said chucks and backstop structure, a bottle carrying rack disposed between said receivers and the backstop structure in each unit, said bottle carrying rack mounted for substantially rectilinear movement in a vertical plane paralleling the backstop structure in which a horizontal run is provided equal in length to the spacing between stations in the unit, and drive means for the rack synchronized with the drive means for the receivers whereby the receivers move into bottle holding relationship with the backstop structure and chucks at the forward end of said horizontal run and out of bottle holding relationship at the beginning of said horizontal run, the respective racks in the two units operating in unison and arranged so that the rack of the first unit delivers bottles to the first station in the second unit.

10. In a decorating machine for applying color compositions to bottles, a plurality of equally spaced stations having cyclically operating bottle holding means associated therewith, means for moving bottles through the machine from station to station including a rigid rack having a plurality of bottle cradles rigidly mounted upon it, said cradles being spaced in accordance with the spacing of said stations, means for moving said rack in a substantially rectilinear path in which a horizontal run is provided equal in length to the distance between stations, said rack having one more cradle mounted upon it than the number of stations in the machine, whereby when the rack is at the start of said horizontal run a cradle is in position to receive an undecorated bottle for transportation to the first station in the machine, and when the rack is at the end of said horizontal run a cradle at the opposite end of the rack is in position to deliver a decorated bottle, a first ware carrier adapted to swing in a vertical plane and deposit a bottle upon said first cradle each time said first cradle is in said bottle receiving position, and a second ware carrier adapted to swing in a vertical plane and pick up a bottle from the cradle at the opposite end of the rack each time the latter cradle is in said position to deliver a bottle.

11. In a decorating machine for applying color compositions to pieces of ware, ware handling apparatus comprising, a plurality of equally spaced ware receivers disposed longitudinally of the machine, rotatable chucks disposed opposite two of the receivers, stationary backstop structure disposed opposite the other receivers, means for moving said receivers into and out of ware-holding relationship with the backstop structure and chucks, in which relationship pieces of ware interposed between the receivers and chucks are free to rotate and pieces of ware interposed between the receivers and backstop structure are held against rotation, and ware carrying means adapted to move ware from receiver to receiver operable when said receivers are out of ware-holding position.

12. In a decorating machine for applying color compositions to bottles, a plurality of bottle neck receivers mounted in spaced relationship, fixed backstop structure mounted opposite some of the receivers, rotatably mounted chucks disposed opposite other receivers having bottle registration mechanism associated therewith, means for moving said receivers into and out of bottle holding relationship with the backstop structure and chucks, in which relationship the bottles at the chucks are free to rotate and the bottles at the backstop structure are held against rotation, and bottle carrying means for moving said bottles from receiver to receiver operable when said receivers are out of bottle holding relationship.

13. In a decorating machine for applying color compositions to bottles, a plurality of bottle neck receivers mounted in spaced relationship, fixed backstop structure disposed opposite to some of said receivers, rotatably mounted chucks disposed opposite to other receivers, bottle orientation means associated with said chucks, means for moving said receivers in unison into and out of bottle holding relationship with said backstop structure and said chucks, in which relationship the bottles at the chucks are free to be rotated for orientation purposes and the bottles at the backstop structure are rigidly held against rotation, and means for moving said bottles in unison to successive receivers operable when said receivers are out of bottle holding relationship, the latter named means including a rigid rack, a plurality of cradles mounted upon said rack in accordance with the spacing of said receivers, means for moving said rack in a substantially rectilinear path in which the cradles move up into bottle supporting relationship before the bottles are released by said receivers, so that upon said release the orientation of the respective bottles is not disturbed, and thence horizontally a distance equal to the distance between adjacent receivers to deliver said bottles to succeeding receivers in the same condition of orientation which existed at the time of said release.

14. In a decorating machine for applying color compositions to bottles, a plurality of bottle neck receivers mounted in spaced relationship, fixed abutment structure disposed opposite to some of said receivers, rotatably mounted chucks disposed opposite to other receivers, bottle orientation means associated with said chucks, means for moving said receivers in unison into and out of bottle holding relationship with said abutment structure and said chucks, in which relationship the bottles at the chucks are free to be rotated for orientation purposes and the bottles at the fixed abutment structure are held against rotation, and means for moving said bottles in unison to successive receivers operable when said receivers are out of bottle holding relationship, the latter named means adapted to move into bottle supporting relationship at the receivers before the receivers move out of bottle holding relationship so that the orientation of the bottles is not altered upon the release of the bottles by such movement.

15. In a decorating machine for applying color compositions to bottles, bottle handling apparatus comprising fixed backstop structure extending longitudinally of the machine, a slide mounted parallel with said backstop structure, a plurality of equally spaced bottle mouthpiece receivers mounted upon said slide, drive means for moving said slide toward and away from said backstop structure into and out of bottle holding relationship with it in which bottles are clamped between said receivers and said backstop structure in non-rotatable relationship, a bottle carrying rack mounted between said backstop structure and said slide for substantial rectilinear movement in a plane paralleling said backstop structure in which a forward and a backward movement is provided which is equal to the spacing between mouthpiece receivers, and said rack adapted to move into bottle carrying position before the slide moves out of bottle holding relationship, whereby the orientation of the bottles is not altered upon the reception of the bottles by the rack.

16. In a decorating machine for applying color compositions to pieces of ware, ware handling apparatus comprising a plurality of equally spaced ware receivers disposed in alignment longitudinally of the machine, rotatable ware holding chucks disposed opposite two of said receivers, ware orienting means associated with said rotatable chucks, stationary ware abutment structure disposed opposite the other receivers, and means for moving said receivers simultaneously into ware holding relationship with the said stationary ware abutment structure and with said chucks, in which relationship pieces of ware interposed between the receivers and rotatable chucks are free to be rotated for ware orientation purposes and pieces of ware interposed between the receivers and said stationary ware abutment structure are held against rotation.

References Cited in the file of this patent

UNITED STATES PATENTS

| | | |
|---|---|---|
| 1,990,498 | Nordquist | Feb. 12, 1935 |
| 2,193,840 | Oberhoffken | Mar. 19, 1940 |
| 2,231,535 | Jackson et al. | Feb. 11, 1941 |